(12) United States Patent
Yamauchi et al.

(10) Patent No.: US 12,338,314 B2
(45) Date of Patent: Jun. 24, 2025

(54) POLYISOCYANATE COMPOSITION, FILM-FORMING COMPOSITION, FILM, FILM LAMINATE, ADHESIVE RESIN COMPOSITION AND ADHESIVE RESIN-CURED PRODUCT, COATING COMPOSITION AND COATING MATERIAL-CURED PRODUCT

(71) Applicant: ASAHI KASEI KABUSHIKI KAISHA, Tokyo (JP)

(72) Inventors: Masakazu Yamauchi, Tokyo (JP); Takahiro Funatsu, Tokyo (JP); Akira Takei, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/673,479

(22) Filed: May 24, 2024

(65) Prior Publication Data

US 2024/0309146 A1    Sep. 19, 2024

Related U.S. Application Data

(62) Division of application No. 17/621,021, filed as application No. PCT/JP2020/024946 on Jun. 25, 2020.

(30) Foreign Application Priority Data

Jun. 27, 2019 (JP) ................................. 2019-119464
Sep. 18, 2019 (JP) ................................. 2019-169623

(51) Int. Cl.
| | |
|---|---|
| C08G 18/80 | (2006.01) |
| C08G 18/02 | (2006.01) |
| C08G 18/10 | (2006.01) |
| C08G 18/16 | (2006.01) |
| C08G 18/18 | (2006.01) |
| C08G 18/20 | (2006.01) |
| C08G 18/42 | (2006.01) |
| C08G 18/62 | (2006.01) |
| C08G 18/73 | (2006.01) |
| C08G 18/78 | (2006.01) |
| C08G 18/79 | (2006.01) |
| C08J 5/18 | (2006.01) |

(52) U.S. Cl.
CPC ........... *C08G 18/73* (2013.01); *C08G 18/022* (2013.01); *C08G 18/10* (2013.01); *C08G 18/168* (2013.01); *C08G 18/1875* (2013.01); *C08G 18/2072* (2013.01); *C08G 18/2081* (2013.01); *C08G 18/4269* (2013.01); *C08G 18/6216* (2013.01); *C08G 18/7837* (2013.01); *C08G 18/7887* (2013.01); *C08G 18/792* (2013.01); *C08G 18/798* (2013.01); *C08G 18/8048* (2013.01); *C08G 18/8064* (2013.01); *C08G 18/807* (2013.01); *C08G 18/8093* (2013.01); *C08G 18/8096* (2013.01); *C08J 5/18* (2013.01); *C08G 2150/00* (2013.01); *C08G 2170/00* (2013.01)

(58) Field of Classification Search
CPC .. C08G 18/2072; C08G 18/22; C08G 18/798; C08G 18/6216; C08G 18/8093; C08G 18/7887; C08G 18/8064; C08G 18/8048; C08G 18/2081; C08G 18/7837; C08G 18/8096; C08G 18/168; C08G 18/792
See application file for complete search history.

(56) References Cited

U.S. PATENT DOCUMENTS

| | | | |
|---|---|---|---|
| 3,723,372 A * | 3/1973 | Waldmoto et al. ........................ C08G 18/8061 |
| | | | 524/378 |
| 4,055,550 A | 10/1977 | Panandiker et al. | |
| 4,252,923 A | 2/1981 | Konig et al. | |
| 4,345,057 A | 8/1982 | Yamabe et al. | |
| 4,640,966 A | 2/1987 | Mitani et al. | |
| 4,925,974 A | 5/1990 | Gras | |
| 5,200,489 A | 4/1993 | Jacobs et al. | |
| 2007/0218209 A1 | 9/2007 | Asahina et al. | |
| 2011/0008628 A1 | 1/2011 | Fujita et al. | |
| 2016/0369034 A1 | 12/2016 | Fukuchi et al. | |
| 2017/0114179 A1 | 4/2017 | Yamauchi et al. | |
| 2017/0348953 A1 | 12/2017 | Takamatsu et al. | |
| 2018/0093450 A1 | 4/2018 | Nagata et al. | |

(Continued)

FOREIGN PATENT DOCUMENTS

| | | |
|---|---|---|
| CN | 001926163 A | 3/2007 |
| CN | 110520456 A | 11/2007 |
| CN | 104093760 A | 10/2014 |

(Continued)

OTHER PUBLICATIONS

Search Report issued in European Patent Application No. 24189192.8, Oct. 23, 2024.
ISR issued in International Patent Application No. PCT/JP2020/024946, Aug. 11, 2020, translation.
Written Opinion issued in International Patent Application No. PCT/JP2020/024946, Aug. 11, 2020, translation.
Feng Tao et al., "Study on Synthesis and Application of Water Dispersible Polyisocyanate", Polyurethane Industry, vol. 21, No. 3, 2006, translation and abstract.

(Continued)

*Primary Examiner* — Michael L Leonard
(74) *Attorney, Agent, or Firm* — GREENBLUM & BERNSTEIN, P.L.C.

(57) ABSTRACT

A polyisocyanate composition having at least one isocyanate compound selected from an aliphatic isocyanate and an alicyclic isocyanate as a skeleton, wherein an average value of a total number of isocyanate groups blocked with a blocking agent and not blocked with a blocking agent per polyisocyanate molecule is 2 or more, and among the isocyanate groups in the polyisocyanate composition, 1 mol % or more and 99 mol % or less are blocked with a blocking agent, and the like.

6 Claims, No Drawings

(56) References Cited

U.S. PATENT DOCUMENTS

| | | |
|---|---|---|
| 2018/0282574 A1 | 10/2018 | Takeno et al. |
| 2019/0100615 A1 | 4/2019 | Yamauchi et al. |

FOREIGN PATENT DOCUMENTS

| | | | |
|---|---|---|---|
| CN | 105339408 A | 2/2016 |
| CN | 107922584 A | 4/2018 |
| CN | 108699204 A | 10/2018 |
| CN | 109071769 A | 12/2018 |
| EP | 3 428 207 A1 | 1/2019 |
| EP | 3 604 372 A1 | 2/2020 |
| JP | S49-028255 B | 7/1974 |
| JP | 50-033507 B | 10/1975 |
| JP | S53-012990 A | 2/1978 |
| JP | S55-049360 A | 4/1980 |
| JP | S57-034107 A | 2/1982 |
| JP | S58-080320 A | 5/1983 |
| JP | S61-275311 A | 12/1986 |
| JP | H10-060073 A | 3/1998 |
| JP | 2005-154777 A | 6/2005 |
| JP | 2005-255892 A | 9/2005 |
| JP | 2007-297569 A | 11/2007 |
| JP | 2011-184602 A | 9/2011 |
| JP | 5371884 B | 12/2013 |
| JP | 2016-027153 A | 2/2016 |
| JP | 2016-113523 A | 6/2016 |
| JP | 2016-120642 A | 7/2016 |
| JP | 2016-203434 A | 12/2016 |
| JP | 2017-052944 A | 3/2017 |
| JP | 2017-082076 A | 5/2017 |
| WO | 02/070613 A2 | 9/2002 |

OTHER PUBLICATIONS

Wicks et al.: "Blocked Isocyanates III: Part B. Uses and Applications of Blocked Isocyanates", Process in Organic Coatings, Elsevier BV, NL, vol. 41, No. 1-3, Mar. 1, 2001, pp. 1-83, XP002516705, ISSN: 0300-9440, DOI: 10.1016/S0300-9440(00)00164-8.

Rolph et al.: "Blocked isocyanates: from analytical and experimental considerations to non-polyurethane applications", Polymer Chemistry, vol. 7, No. 48, Jan. 1, 2016, pp. 7351-7364, XP055645469, Cambridge ISSN: 1759-9954, DOI: 10.1039/C6PY01776B.

European Search Report issued in EP Patent Application No. 20832881.5, Jun. 20, 2023.

\* cited by examiner

POLYISOCYANATE COMPOSITION, FILM-FORMING COMPOSITION, FILM, FILM LAMINATE, ADHESIVE RESIN COMPOSITION AND ADHESIVE RESIN-CURED PRODUCT, COATING COMPOSITION AND COATING MATERIAL-CURED PRODUCT

This application is a Divisional of U.S. patent application Ser. No. 17/621,021, filed Dec. 20, 2021, which is a U.S. National Stage Entry of International Patent Application No. PCT/JP2020/024946, filed Jun. 25, 2020, which claims the benefit of Japanese Patent Application No. 2019-119464, filed Jun. 27, 2019, and Japanese Patent Application No. 2019-169623, filed Sep. 18, 2019. The disclosure of each of the applications listed above is incorporated by reference herein in its entirety.

TECHNICAL FIELD

The present invention relates to a polyisocyanate composition, film-forming composition, film, film laminate, adhesive resin composition and adhesive resin-cured product, and coating composition and coating material-cured product.

BACKGROUND ART

Polyisocyanate compositions obtained from aliphatic diisocyanates and alicyclic diisocyanates have been widely used in various applications because of their excellent weather resistance and heat resistance.

Further, since the blocked polyisocyanate composition in which the isocyanate group of the polyisocyanate composition is blocked with a blocking agent exhibits a storage stability after being mixed with an active hydrogen compound while maintaining the physical properties after curing, it is widely used as a curing agent for automobile coating.

PTL 1 discloses, as an improvement technique for a blocked polyisocyanate composition, a blocked polyisocyanate blocked with two types of blocking agents, a pyrazole-based blocking agent and an oxime-based blocking agent in order to exhibit low-temperature curability and adhesion to various substrates. Further, PTL 2 discloses a curable adhesive composition using a polyisocyanate composition in which a blocked polyisocyanate compound and a non-blocked polyisocyanate compound are mixed, as a technique for achieving both crosslink density and curing strain.

However, in order to exhibit improved performance in various urethane-based thermosetting compositions, further improvement is desired for a polyisocyanate or blocked polyisocyanate.

An example of a field for which improvement is desired is the field of decorative films for interior and exterior parts of automobiles. As a method of decorating the surface of a three-dimensional base material such as interior/exterior parts of an automobile, a method of attaching a film having a design (hereinafter referred to as "decorative film") to the surface of the base material is known. As a typical film-pasting method, a vacuum/compressed air molding method can be mentioned. In the vacuum/compressed air molding method, a decorative film is stretched on a preformed base material at room temperature or in a heating atmosphere, and is attached to the base material by utilizing the pressure difference. In this method, since the decorative film is attached to the base material surface of the part by work separate from the molding of the base material, a base material of various materials and shapes can be used with one vacuum/air-pressure molding device. A decorative film can be attached to the surface. In molded products obtained from plastics, metals or various other materials, the surface is generally decorated for the purpose of imparting design to the surface or protecting the surface.

As a decorative film, laminated films as described in PTLs 3 to 4 and the like are known. The decorative film used in the vacuum/air-pressure forming method is required to have high stretchability. Further, when a decorative film is used for a three-dimensional base material typified by an automobile exterior part, not only stretchability but also weather resistance and solvent resistance are required. However, in the techniques of PTLs 3 and 4, it may be difficult to achieve both stretchability and solvent resistance.

Further, in the process of manufacturing, storing and transporting the film, it is necessary to wind the film into a roll. At that time, the wound films may adhere to each other due to blocking. Therefore, blocking resistance that does not cause such problems is also required.

In addition, another example of a field for which improvement is desired is in the field of optical members. In recent years, since optical members have come to be used under harsh conditions, in polyester films used for optical members, expectations are increasing for adhesive resin compositions that can exhibit performance such as solvent resistance before lamination, adhesion to various functional layers used as an upper layer, and stability under high temperature and high humidity. Therefore, a polyisocyanate composition that can be used for these purposes and an adhesive resin composition using the same are desired.

Further, in recent years, a curing agent in a two-component coating composition is also required to have high solvent resistance from the viewpoint of high functionality. PTL 5 provides a polyisocyanate composition having an increased number of functional groups of isocyanate in order to further promote cross-linking of the coating composition. On the other hand, in the case of a two-component coating composition, it is desirable that the two-component composition have a long usability time as a coating material after being blended.

In the above coating composition, the solvent resistance tends to be excellent when the cross-linking of the coating film is increased, but there is a concern that the available time of the coating material is shortened when the number of functional groups is increased.

CITATION LIST

Patent Literature

[PTL 1] Japanese Patent No. 5371884
[PTL 2] Japanese Unexamined Patent Application, First Publication No. 2016-027153
[PTL 3] Japanese Unexamined Patent Application, First Publication No. 2016-203434
[PTL 4] Japanese Unexamined Patent Application, First Publication No. 2016-120642
[PTL 5] Japanese Unexamined Patent Application, First Publication No. 2017-82076

SUMMARY OF INVENTION

Technical Problem

By using the techniques described in PTLs 3 and 4, it is possible to obtain a film having good stretchability. However, a decorative film having both solvent resistance and blocking resistance in addition to high stretchability has not been studied. Further, in the field of optical members, there is a demand for a polyisocyanate composition capable of exhibiting performance such as solvent resistance before lamination when made into an adhesive resin-cured product, adhesion to various functional layers used as an upper layer, and stability under high temperature and high humidity. Further, from the viewpoint of enhancing the functionality of the two-component coating composition, a polyisocyanate composition capable of achieving both higher solvent resistance of the coating film and longer available time of the coating material is desired.

The present invention has been made in view of the above circumstances, and provides a polyisocyanate composition having excellent blocking resistance and solvent resistance while maintaining good stretchability of a film when used as a film-forming composition; having excellent solvent resistance before lamination, adhesion to various functional layers used as an upper layer, and stability under high temperature and high humidity when used as an adhesive resin composition; and capable of achieving both solvent resistance of a coating film and usability time of a coating film when used as a coating composition, and a film-forming composition, a film, a film laminate, an adhesive resin composition and an adhesive resin-cured product, a coating composition, and a coating material-cured product using the polyisocyanate composition.

Solution to Problem

That is, the present invention includes the following aspects.
[1] A polyisocyanate composition comprising at least one isocyanate compound selected from the group consisting of an aliphatic isocyanate and an alicyclic isocyanate as a skeleton, wherein
　an average value of a total number of isocyanate groups blocked with a blocking agent and not blocked with a blocking agent per polyisocyanate molecule is 2 or more, and
　among the isocyanate groups in the polyisocyanate composition, 1 mol % or more and 99 mol % or less are blocked with a blocking agent.
[2] The polyisocyanate composition according to [1], wherein the average value of the total number of isocyanate groups blocked with a blocking agent and not blocked with a blocking agent per polyisocyanate molecule is 3 or more.
[3] The polyisocyanate composition according to [1] or [2], wherein the polyisocyanate composition contains a polyisocyanate represented by the following general formula (I),

[Chemical formula 1]

(I)

(in the general formula (I), $R^{11}$ is a residue obtained by removing isocyanate groups from a polyisocyanate derived from the isocyanate compound, $X^{11}$ is a structural unit derived from a blocking agent, m and n are independently integers of 1 or more, and n/(m+n) is 0.01 or more and 0.99 or less.)
[4] The polyisocyanate composition according to any one of [1] to [3], wherein among the isocyanate groups in the polyisocyanate composition, 10 mol % or more and 90 mol % or less are blocked with a blocking agent.
[5] A film-forming composition comprising the polyisocyanate composition according to any one of [1] to [4].
[6] The film-forming composition according to [5], further comprising an active hydrogen-containing compound.
[7] The film-forming composition according to [6], wherein the active hydrogen-containing compound contains an acrylic polyol.
[8] The film-forming composition according to [6], wherein the active hydrogen-containing compound contains a diol.
[9] A film obtained by curing the film-forming composition according to any one of [5] to [8].
[10] A film laminate comprising
　at least two types of layers selected from the group consisting of a substrate layer, a decorative layer, and an adhesive layer, wherein
　at least one of the layers constituting the film laminate includes the film according to [9].
[11] An article comprising the film according to [9] or the film laminate according to [10].
[12] The article according to [11], which is obtained by a manufacturing method comprising
　a step of attaching the film according to [9] or the film laminate according to [10] so as to follow the article while heating, and
　a step of curing the pasted film or film laminate.
[13] An adhesive resin composition comprising the polyisocyanate composition according to any one of [1] to [4].
[14] The adhesive resin composition according to [13], further comprising an active hydrogen-containing compound.
[15] An adhesive resin-cured product obtained by curing the adhesive resin composition according to [13] or [14].
[16] A method for producing a laminate, comprising
　a step of applying the adhesive resin composition according to [13] or [14] to at least one adherend, and
　a step of laminating the adherend coated with the adhesive resin composition with another adherend.
[17] The method for producing a laminate according to [16], further comprising a step of heating the laminated adherends.
[18] A coating composition comprising the polyisocyanate composition according to any one of [1] to [4].
[19] The coating composition according to [18], further comprising an active hydrogen-containing compound.
[20] A coating material-cured product obtained by curing the coating composition according to [18] or [19].
[21] A composite resin-cured product, comprising
　the coating composition according to [18] or [19], and
　a metal ingredient, a glass ingredient, a plastic ingredient or a wood ingredient as a base material.
[22] A method for producing a coating film, comprising a step of coating the coating composition according to [18] or [19].
[23] A primary cured film obtained by curing a polyisocyanate composition including at least one isocyanate compound selected from the group consisting of an aliphatic isocyanate and an alicyclic isocyanate as a skeleton, and an active hydrogen-containing composition, comprising
　at least one functional group X selected from the group consisting of a urethane group, a urea group, and an amide group produced by curing the active hydrogen-containing compound and the polyisocyanate composition,
　an active hydrogen group, and
　an isocyanate group blocked with a blocking agent.

[24] The primary cured film according to [23], wherein a ratio γ/β between a molar amount γ of the functional group X and a molar amount β of the isocyanate group blocked with a blocking agent contained in the primary cured film is 0.1 or more and 9.0 or less.

[25] The primary cured film according to [23] or [24], wherein the molar amount γ of the functional group X contained in 1 kg of the primary cured film is 0.05 or more and 1.0 or less.

[26] The primary cured film according to any one of [23] to [25], wherein the active hydrogen-containing compound includes an acrylic polyol.

[27] The primary cured film according to any one of [23] to [26], wherein the active hydrogen-containing compound includes a diol.

[28] A secondary cured film obtained by curing the primary cured film according to any one of [20] to [27] by heating further.

[29] A method for producing a secondary cured film, comprising
    a step of attaching the primary cured film according to any one of [23] to [27] so as to follow the molded product while heating at 50° C. or higher and 140° C. or lower, and
    a step of curing the attached resin composition by heating at 50° C. or higher and 180° C. or lower thereafter.

[30] The method for producing a secondary cured film according to [29], wherein a ratio γ/γ' between a molar amount γ of the functional group X contained in the primary cured film and a molar amount γ' of the functional group X contained in the secondary cured film is 0.1 or more and 0.9 or less.

[31] The method for producing a secondary cured film according to [29] or [30], wherein
    the molar amount γ of the functional group X contained in 1 kg of the primary cured film is 0.05 or more and 1.0 or less, and
    the molar amount γ' of the functional group X contained in 1 kg of the secondary cured film is 0.5 or more and 10 or less.

[32] Use of a primary cured film, comprising
    a step of attaching the primary cured film according to any one of [23] to [27] so as to follow the molded product while heating at 50° C. or higher and 140° C. or lower, and
    a step of curing the attached resin composition by heating at 50° C. or higher and 180° C. or lower thereafter.

[33] A primary cured film comprising a crosslinked structure and a curable functional group A.

[34] A film-forming composition, comprising a curable functional group A of the primary cured film according to [33], wherein
    the film-forming composition is able to produce a crosslinked structure of the primary cured film according to [33].

[35] A secondary cured film obtained by curing the primary cured film according to [33].

[36] A method for producing a secondary cured film, comprising
    a step of attaching the primary cured film according to [33] so as to follow the molded product while heating, and
    a step of curing the attached resin composition thereafter.

[37] An article comprising the primary cured film according to [33] or the secondary cured film according to [34].

[38] An article comprising a secondary cured film obtained by the method according to [36].

Advantageous Effects of Invention

According to the polyisocyanate composition of the above-described aspect, it is possible to provide a polyisocyanate composition having excellent blocking resistance and solvent resistance while maintaining good stretchability of a film when used as a film-forming composition; having excellent solvent resistance before lamination, adhesion to various functional layers used as an upper layer, and stability under high temperature and high humidity when used as an adhesive resin composition; and capable of achieving both solvent resistance of a coating film and available time of a coating film when used as a coating composition. According to the film-forming composition and the film of the above-described aspect, it is possible to provide a film having excellent blocking resistance and solvent resistance while maintaining good stretchability. The film laminate of the above aspect includes a layer made of the film and has excellent blocking resistance and solvent resistance. According to the adhesive resin composition and the adhesive resin-cured product of the above-described aspect, it is possible to provide an adhesive resin-cured product having excellent solvent resistance before lamination, adhesion to various functional layers used as an upper layer, and stability under high temperature and high humidity. According to the coating composition and the coating material-cured product of the above-described aspect, it is possible to provide a coating material-cured product having excellent solvent resistance of coating film and having a sufficient available time (hereinafter, may be referred to as "pot life") of coating material.

DESCRIPTION OF EMBODIMENTS

Hereinafter, embodiments for carrying out the present invention (hereinafter, simply referred to as "the present embodiment") will be described in detail. The following embodiments are examples for explaining the present invention, and are not intended to limit the present invention to the following embodiments. The present invention can be appropriately modified and implemented within the scope of the gist thereof.

As used herein, the term "polyisocyanate" means a polymer in which a plurality of monomers having one or more isocyanate groups (—NCO) are bonded.

Further, as used herein, the term "polyol" means a compound having two or more hydroxyl groups (—OH).

Unless otherwise specified, "(metha) acrylic" includes methacrylic and acrylic.

<<Polyisocyanate Composition>>

The polyisocyanate composition of the present embodiment has at least one isocyanate compound selected from the group consisting of an aliphatic isocyanate and an alicyclic isocyanate as a skeleton.

The average value of the total number of isocyanate groups blocked with a blocking agent and not blocked with a blocking agent per polyisocyanate molecule in the polyisocyanate composition (hereinafter, may be abbreviated as "total average number of isocyanate groups") is 2 or more. The lower limit of the total average number of isocyanate groups is 2, preferably 2.3, more preferably 3, even more preferably 3.4, and particularly preferably 4.5. On the other hand, although the upper limit of the total average number of isocyanate groups is not particularly limited, it is preferably 20, more preferably 15, even more preferably 10, and particularly preferably 8. That is, the total average number of isocyanate groups is 2 or more, preferably 2 or more and 20 or less, more preferably 2.3 or more and 15 or less, even more preferably 3 or more and 10 or less, particularly preferably 3.4 or more and 10 or less, and most preferably 4.5 or more and 8 or less.

When the total average number of isocyanate groups is at least the above lower limit, the crosslinkability can be further improved, and a film having excellent blocking resistance and solvent resistance can be obtained. On the other hand, when the total average number of isocyanate groups is not more than the above upper limit, excessive cross-linking can be suppressed more effectively and good stretchability of the obtained film can be maintained.

The total average number of isocyanate groups can be calculated by the following formula. In the following formula, "Mn" is the number-average molecular weight of the polyisocyanate composition measured after dissociating the blocking agent by heating or the like. The "NCO content" is the content of isocyanate groups present in the total mass of the polyisocyanate composition measured after dissociating the blocking agent by heating or the like. Also, in order to convert the NCO content from a percentage to a decimal, the NCO content is multiplied by "0.01". "42" is the formula amount of isocyanate.

$$\text{Total average number of isocyanate groups(total average number of NCO)} = (Mn \times NCO\ content \times 0.01)/42$$

The number-average molecular weight (Mn) can be calculated, for example, by performing gel permeation chromatography (GPC) measurement on the polyisocyanate composition. The NCO content can be calculated by a titration method using, for example, a polyisocyanate composition in which the blocking agent is dissociated by heating or the like as a sample. Specifically, it can be calculated by using the method shown in the Examples described later.

Alternatively, the total average number of isocyanate groups can be calculated by performing $^{13}C$-NMR measurement using the polyisocyanate composition as a sample.

Examples of the polyisocyanates having a total average number of isocyanate groups within the above range include isocyanurate-type polyisocyanates formed by trimerizing diisocyanates, biuret-type polyisocyanates formed by a reaction of three molecules of isocyanate groups with one molecule of water, and allophanate-type polyisocyanates formed by a reaction of two molecules of isocyanate groups with one molecule of a hydroxyl group of alcohol. Among them, isocyanurate-type polyisocyanate is preferable as the polyisocyanate in which the total average number of isocyanate groups is within the above range from the viewpoint of weather resistance.

The proportion of isocyanate groups blocked with a blocking agent (hereinafter, may be referred to as "blocking rate") in the polyisocyanate composition is 1 mol % or more and 99 mol % or less.

When the polyisocyanate composition is used for a film-forming composition, the blocking rate is preferably 10 mol % or more and 90 mol % or less, more preferably 30 mol % or more and 90 mol % or less, even more preferably 50 mol % or more and 80 mol % or less, and particularly preferably 50 mol % or more and 80 mol % or less.

When the blocking rate is at least the above lower limit, good stretchability of the obtained film can be maintained. On the other hand, when the blocking rate is not more than the above upper limit, the handling property of the obtained film at room temperature, that is, the blocking resistance at room temperature can be improved.

On the other hand, when the polyisocyanate composition is used for the adhesive resin composition, the blocking rate is preferably 10 mol % or more and 90 mol % or less, more preferably 20 mol % or more and 80 mol % or less, even more preferably 30 mol % or more and 70 mol % or less, and particularly preferably 40 mol % or more and 60 mol % or less.

When the blocking rate is at least the above lower limit, the adhesion to various functional layers used as an upper layer of the obtained adhesive resin-cured product (hereinafter, may be abbreviated as "adhesion to the upper layer") and the stability under high temperature and high humidity, for example, at 80° C. and 95% RH, can be improved. On the other hand, when the blocking rate is not more than the above upper limit, the solvent resistance before the various functional layers are laminated on the upper layer of the obtained adhesive resin-cured product (hereinafter, may be abbreviated as "solvent resistance before lamination") can be made better.

On the other hand, when the polyisocyanate composition is used in a coating composition, the blocking rate is preferably 10 mol % or more and 90 mol % or less, more preferably 20 mol % or more and 85 mol % or less, and even more preferably 30 mol % or more and 75 mol % or less. When the blocking rate is within the above range, the solvent resistance and the low-temperature drying property of the obtained coating material-cured product can be improved, and the pot life of the coating material can be made longer. The blocking rate can be measured by using the method shown in the Examples described later. The blocking rate can be calculated using, for example, a titration method or a method shown in the Examples described later. Specifically, the blocking rate can be calculated from the following equation.

$$\text{Blocking rate} = \text{Molar amount of blocking agent/Molar amount of isocyanate group}$$

The "molar amount of isocyanate group" in the above formula is the molar amount of isocyanate group per mass of the polyisocyanate composition after the blocking agent is dissociated by heat treatment, and can be quantified by the following equation using the NCO content. Here, in order to convert the NCO content from a percentage to a decimal, the NCO content is multiplied by "0.01". "42" is the formula amount of isocyanate.

$$\text{Molar amount of isocyanate group} = (NCO\ content \times 0.01)/42$$

Further, the "molar amount of blocking agent" in the above equation can be quantified by trapping the blocking agent at the time of dissociation of the blocking agent and measuring the molar amount of the blocking agent by gas chromatography-mass spectrometry.

Since the polyisocyanate composition of the present embodiment has the above-described configuration, it is possible to provide a polyisocyanate composition having excellent blocking resistance and solvent resistance while maintaining good stretchability of a film when used as a film-forming composition; having excellent solvent resistance before lamination, adhesion to various functional layers used as an upper layer, and stability under high temperature and high humidity when used as an adhesive resin composition; and capable of achieving both solvent resistance of a coating film and available time of a coating film when used as a coating composition.

Each of the components contained in the polyisocyanate composition of the present embodiment will be described in detail below.

The polyisocyanate composition contains a blocked polyisocyanate derived from a polyisocyanate and a blocking agent. The blocked polyisocyanate is configured by blocking some or all of the isocyanate groups in one molecule of the blocked polyisocyanate with a blocking agent. Hereinafter, the blocked polyisocyanate in which some of the isocyanate groups in one molecule of the blocked polyisocyanate are blocked with a blocking agent is referred to as a "partially blocked polyisocyanate". Further, the blocked polyisocyanate in which all of the isocyanate groups in one molecule of the blocked polyisocyanate are blocked with a blocking agent is referred to as "completely blocked polyisocyanate".

Further, the polyisocyanate composition may contain an unblocked polyisocyanate (hereinafter, may be referred to as "unblocked polyisocyanate") in addition to the blocked polyisocyanate.

When the polyisocyanate composition contains only a blocked polyisocyanate, the blocking rate can be controlled within the above-described range by using the partially blocked polyisocyanate alone or using the partially blocked polyisocyanate and the completely blocked polyisocyanate in combination and adjusting the mixing ratio. On the other hand, when the polyisocyanate composition contains a blocked polyisocyanate and an unblocked polyisocyanate, the blocking rate can be controlled within the above-described range by adjusting the mixing ratio of the partially blocked polyisocyanate or completely blocked polyisocyanate to the unblocked polyisocyanate.

[Polyisocyanate]

The polyisocyanate as a raw material of the polyisocyanate composition is derived from at least one isocyanate compound selected from the group consisting of an aliphatic isocyanate and an alicyclic isocyanate, and has a skeleton of the isocyanate compound. The polyisocyanate may contain an isocyanurate group, a biuret group, an allophanate group, an oxadiazine trione group, a urea group, and a urethane group, and preferably has an isocyanurate group. The isocyanate compound that serves as the skeleton of the polyisocyanate is not particularly limited, but specifically, a compound that does not contain an aromatic ring such as a benzene ring in its structure is preferable.

(Alphatic Isocyanate)

The aliphatic isocyanate is not particularly limited, and specific examples thereof include an aliphatic monoisocyanate, aliphatic diisocyanate, lysine triisocyanate, 4-isocyanatomethyl-1,8-octamethylene diisocyanate (trimmer triisocyanate) and the like. Among the examples, an aliphatic diisocyanate is preferable.

The aliphatic diisocyanate is not particularly limited, but specifically, one having 4 or more and 30 or less carbon atoms is preferable, and examples thereof include a tetramethylene diisocyanate, pentamethylene diisocyanate, hexamethylene diisocyanate (hereinafter referred to as "HDI"), 2,2,4-trimethyl-1,6-diisocyanatohexane, lysine diisocyanate and the like. Among the examples, HDI is preferable because of its easy availability in the industry. The aliphatic diisocyanate may be used alone, or in combination of two or more.

(Alicyclic Isocyanate)

The alicyclic isocyanate is not particularly limited, and specific examples thereof include an alicyclic monoisocyanate and an alicyclic diisocyanate. Among them, an alicyclic diisocyanate is preferable.

The alicyclic diisocyanate is not particularly limited, but specifically, one having 8 or more and 30 or less carbon atoms is preferable, and examples thereof include an isophorone diisocyanate (hereinafter referred to as "IPDI"), 1,3-bis (isocyanatomethyl)-cyclohexane, 4,4'-dicyclohexylmethane diisocyanate, norbornene diisocyanate, hydrogenated xylylene diisocyanate and the like. Among the examples, IPDI is preferable from the viewpoint of weather resistance and easy industrial availability. The alicyclic diisocyanate may be used alone, or in combination of two or more.

[Blocking Agent]

The blocking agent is not particularly limited, and specific examples thereof include a compound having one active hydrogen in the molecule. Such a blocking agent is not particularly limited, and specific examples thereof include an alcohol-based compound, alkylphenol-based compound, phenol-based compound, active methylene-based compound, mercaptan-based compound, acid amide-based compound, acid imide-based compound, imidazole-based compound, urea-based compound, oxime-based compound, amine-based compound, imine-based compound, pyrazole-based compound, triazole-based compound and the like. These blocking agents may be used alone or in combination of two or more. More specific examples of blocking agents are shown below.

The alcohol-based compound is not particularly limited, and specific examples thereof include methanol, ethanol, 2-propanol, n-butanol, sec-butanol, 2-ethyl-1-hexanol, 2-methoxyethanol, 2-ethoxyethanol, 2-butoxyethanol and the like.

The alkylphenol-based compound is not particularly limited, and specific examples thereof include mono and dialkylphenols having an alkyl group having 3 or more and 12 or less carbon atoms as a substituent. Examples of the monoalkylphenols include n-propylphenol, iso-propylphenol, n-butylphenol, sec-butylphenol, tert-butylphenol, n-hexylphenol, 2-ethylhexylphenol, n-octylphenol, n-nonylphenol and the like. Examples of the dialkylphenols include di-n-propylphenol, diisopropylphenol, isopropyl cresol, di-n-butylphenol, di-tert-butylphenol, di-sec-butylphenol, di-n-octylphenol, di-2-ethylhexylphenol, di-n-nonylphenol and the like.

The phenol-based compound is not particularly limited, and specific examples thereof include phenol, cresol, ethylphenol, styrenated phenol, hydroxybenzoic acid ester and the like.

The active methylene-based compound is not particularly limited, and specific examples thereof include dimethyl malonate, diethyl malonate, diisopropyl malonate, methyl acetoacetate, ethyl acetoacetate, acetylacetone, ethyl isobutanoyl acetate and the like.

The mercaptan-based compound is not particularly limited, and specific examples thereof include butyl mercaptan, dodecyl mercaptan and the like.

The acid amide-based compound is not particularly limited, and specific examples thereof include acetanilide, acetate amide, ε-caprolactam, δ-valerolactam, γ-butyrolactam and the like.

The acid imide-based compound is not particularly limited, and specific examples thereof include succinimide, maleate imide and the like.

The imidazole-based compound is not particularly limited, and specific examples thereof include imidazole, 2-methylimidazole and the like.

The urea-based compound is not particularly limited, and specific examples thereof include urea, thiourea, ethylene urea and the like.

The oxime-based compound is not particularly limited, and specific examples thereof include formaldehyde, acetaldoxime, acetoxime, methylethylketooxime, cyclohexanone oxime and the like.

The amine-based compound is not particularly limited, and specific examples thereof include diphenylamine, aniline, carbazole, di-n-propylamine, diisopropylamine, isopropylethylamine and the like.

The imine-based compound is not particularly limited, and specific examples thereof include ethyleneimine, polyethyleneimine and the like.

The pyrazole-based compound is not particularly limited, and specific examples thereof include pyrazole, 3-methylpyrazole, 3,5-dimethylpyrazole and the like.

The triazole-based compound is not particularly limited, and specific examples thereof include 1,2,4-triazole, 1,2,3-triazole and the like.

Among the examples, an acid amide-based compound, oxime-based compound, active methylene-based compound or pyrazole-based compound is preferable in terms of availability, viscosity of the obtained polyisocyanate composition, curing temperature, and curing time. Further, an acid amide-based compound, oxime-based compound or pyrazole-based compound is more preferable in consideration of ease of synthesis when some isocyanate groups remain in the polyisocyanate composition. Specifically, methylethylketooxime, ε-caprolactam, diethyl malonate, 3-methylpyrazole or 3,5-dimethylpyrazole is preferable, and methylethylketooxime, ε-caprolactam, 3-methylpyrazole or 3,5-dimethylpyrazole is more preferable, methylethylketooxime or 3,5-dimethylpyrazole is particularly preferable, and 3,5-dimethylpyrazole is most preferable.

[Partially Blocked Polyisocyanate]

The polyisocyanate composition preferably contains a partially blocked polyisocyanate represented by the following general formula (I) (hereinafter, may be referred to as "partially blocked polyisocyanate (I)").

[Chemical formula 2]

(I)

(In the general formula (I), $R^{11}$ is a residue obtained by removing the isocyanate group from the polyisocyanate derived from the isocyanate compound. $X^{11}$ is a structural unit derived from the blocking agent. m and n are independently an integers of 1 or more, and n/(m+n) is 0.01 or more and 0.99 or less.)

The partially blocked polyisocyanate (I) is derived from the polyisocyanate and the blocking agent, and is configured by partially blocking the isocyanate groups in one molecule of the blocked polyisocyanate with the blocking agent.

As shown in the general formula (I), $X^{11}$, which is a structural unit derived from the blocking agent, is bonded to $R^{11}$, which is a residue obtained by removing the isocyanate group from the isocyanate compound, via an amide bond formed by the reaction of the active hydrogen of the blocking agent with the isocyanate group.

($R^{11}$)

$R^{11}$ is a residue obtained by removing the isocyanate group from the polyisocyanate derived from the isocyanate compound. That is, $R^{11}$ is at least one selected from the group consisting of an aliphatic alkyl group and an alicyclic alkyl group, which may contain a specific functional group. Examples of the specific functional group include an isocyanurate group, biuret group, allophanate group, oxadiazine trione group, urea group, urethane group and the like. The alkyl group for $R^{11}$ may contain these functional groups alone or in combination of two or more.

($X^{11}$)

$X^{11}$ is a structural unit derived from the blocking agent, and is also a residue obtained by removing the active hydrogen from the blocking agent. Examples of $X^{11}$ include structural units derived from the same blocking agents as those exemplified in the above "blocking agents". Among them, as $X^{11}$, structural units derived from an acid amide-based compound, oxime-based compound, active methylene-based compound, or pyrazole-based compound are preferable. Further, structural units derived from an acid amide-based compound, oxime-based compound, or pyrazole-based compound are more preferable. Specifically, structural units derived from methylethylketooxime, ε-caprolactam, diethyl malonate, 3-methylpyrazole or 3,5-dimethylpyrazole are preferable, and methylethylketooxime, ε-caprolactam, 3-methylpyrazole or 3,5-dimethylpyrazole is more preferable, methylethylketooxime or 3,5-dimethylpyrazole is particularly preferable, and 3,5-dimethylpyrazole is most preferable.

(m and n)

m represents the number of isocyanate groups not blocked with the blocking agent in one molecule of the partially blocked polyisocyanate (I). n represents the number of isocyanate groups blocked with the blocking agent in one molecule of the partially blocked polyisocyanate (I).

m and n are independently an integer of 1 or more, and n/(m+n) is 0.01 or more and 0.99 or less. From the viewpoint of crosslinkability, m is preferably 2 or more.

"n/(m+n)" is the ratio of the number of isocyanate groups blocked with the blocking agent to the total number of isocyanate groups not blocked with the blocking agent and the isocyanate groups blocked with the blocking agent in one molecule of the partially blocked polyisocyanate (I).

When the polyisocyanate composition is used for a film-forming composition, n/(m+n) is 0.01 or more and 0.99 or less, preferably 0.10 or more and 0.90 or less, more preferably 0.30 or more and 0.90 or less, even more preferably 0.50 or more and 0.90 or less, and particularly preferably 0.50 or more and 0.80 or less.

When the polyisocyanate composition is used for an adhesive resin composition, n/(m+n) is 0.01 or more and 0.99 or less, preferably 0.10 or more and 0.90 or less, more preferably 0.20 or more and 0.80 or less, even more preferably 0.30 or more and 0.70 or less, and particularly preferably 0.40 or more and 0.60 or less.

When the polyisocyanate composition is used for a coating composition, n/(m+n) is 0.01 or more and 0.99 or less, preferably 0.10 or more and 0.90 or less, more preferably 0.20 or more and 0.85 or less, and even more preferably 0.30 or more and 0.75 or less.

Preferably examples of the partially blocked polyisocyanate (I) include the partially blocked polyisocyanate represented by the following general formula (I-1) and the like.

[Chemical formula 3]

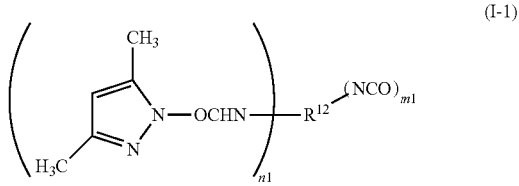

(In the general formula (I-1), $R^{12}$ is the same as $R^{11}$. m1 and n1 are the same as m and n, respectively.)

When the polyisocyanate composition of the present embodiment is used for a film-forming composition, the content of the partially blocked polyisocyanate with respect to the total molar amount of the partially blocked polyisocyanate, the completely blocked polyisocyanate and the unblocked polyisocyanate can be 0 mol % or more and 100 mol % or less, preferably 10 mol % or more and 90 mol % or less, more preferably 30 mol % or more and 90 mol % or less, even more preferably 50 mol % or more and 90 mol % or less, and particularly preferably 50 mol % or more and 80 mol % or less.

When the content of the partially blocked polyisocyanate is within the above-described range, good stretchability of the obtained film can be maintained.

When the polyisocyanate composition of the present embodiment is used for an adhesive resin composition, the content of the partially blocked polyisocyanate with respect to the total molar amount of the partially blocked polyisocyanate, the completely blocked polyisocyanate and the unblocked polyisocyanate can be 0 mol % or more and 100 mol % or less, preferably 10 mol % or more and 90 mol % or less, more preferably 20 mol % or more and 80 mol % or less, even more preferably 30 mol % or more and 70 mol % or less, and particularly preferably 40 mol % or more and 60 mol % or less.

When the content of the partially blocked polyisocyanate is within the above-described range, the solvent resistance before lamination, the adhesion to the upper layer, and the stability under high temperature and high humidity of the obtained adhesive resin-cured product can be improved.

When the polyisocyanate composition of the present embodiment is used for a coating composition, the content of the partially blocked polyisocyanate with respect to the total molar amount of the partially blocked polyisocyanate, the completely blocked polyisocyanate and the unblocked polyisocyanate can be 0 mol % or more and 100 mol % or less, preferably 10 mol % or more and 90 mol % or less, more preferably 20 mol % or more and 85 mol % or less, and even more preferably 30 mol % or more and 75 mol % or less.

When the content of the partially blocked polyisocyanate is within the above-described range, the solvent resistance and the low-temperature curability of the obtained cured coating material can be improved, and the pot life of the coating material can be extended.

The content of the partially blocked polyisocyanate can be measured using the method shown in the Examples described later.

[Method for Producing Polyisocyanate Composition]

The polyisocyanate composition can be produced by reacting the polyisocyanate with a blocking agent.

Examples of the method for producing the polyisocyanate composition include the following two methods.

(1) A method for producing a polyisocyanate composition containing only a partially blocked polyisocyanate by reacting with a blocking agent in a molar amount of 0.01 times or more and 0.99 times or less the molar amount of the isocyanate groups of the polyisocyanate;

(2) A method for producing a polyisocyanate composition by mixing the completely blocked polyisocyanate in which all of the isocyanate groups of the polyisocyanate are blocked with a blocking agent and at least one of the unblocked polyisocyanate and the partially blocked polyisocyanate As a method for producing the polyisocyanate composition, any of the above methods can be used to obtain a desired polyisocyanate composition, and method (1) above is preferable from the viewpoint of better exhibiting the stretchability of the obtained film and the solvent resistance before lamination when it is made into an adhesive resin-cured product.

The reaction between the polyisocyanate and the blocking agent can be carried out by using a known method, and can be carried out with or without a solvent. When a solvent is used, it is necessary to use a solvent that is inert to the isocyanate group. Moreover, a catalyst may also be used if necessary.

Examples of the solvent include esters, ketones, aromatic compounds and the like. Examples of the esters include ethyl acetate, butyl acetate and the like. Examples of the ketones include methyl ethyl ketone and the like. Examples of the aromatic compounds include toluene, xylene and the like.

Examples of the catalyst include organometallic salts, tertiary ammonium salts, alkali metal alcoholates and the like. Examples of the metal used for the organometallic salt include tin, zinc, lead and the like. Examples of the alkali metal include sodium and the like.

The lower limit of the temperature of the reaction between the polyisocyanate and the blocking agent such as a pyrazole-based compound is generally −20° C., preferably 0° C., and more preferably 30° C. On the other hand, the upper limit of the reaction temperature is 150° C., preferably 120° C., and more preferably 100° C.

That is, the reaction temperature is −20° C. or higher and 150° C. or lower, preferably 0° C. or higher and 120° C. or lower, and more preferably 30° C. or higher and 100° C. or lower.

When the reaction temperature is within the above-described range, the side reactions can be reduced and the reaction can be carried out at an appropriate reaction rate.

<<Film-Forming Composition>>

The film-forming composition of the present embodiment contains the following component 1), or components 1) and 2).

1) The polyisocyanate composition described in <<Polyisocyanate composition>>;

2) Active hydrogen-containing compound

According to the film-forming composition of the present embodiment, a film (hereinafter, may be referred to as "primary cured film") having excellent blocking resistance and solvent resistance while maintaining good stretchability can be provided by containing the above-described polyisocyanate composition.

<Active Hydrogen-Containing Compound>

The active hydrogen-containing compound is not particularly limited, and specifically, a compound in which 2 or more active hydrogens are bonded in the molecule is preferable. Preferable examples of the active hydrogen-containing compound include polyol compounds, polyamine compounds, alkanolamine compounds, polythiol compounds and the like. Among the examples, polyol compounds are preferable from the viewpoint of obtaining a film having excellent weather resistance and solvent resistance while maintaining good stretchability.

[Polyol Compound]

The polyol compound is not particularly limited, and specific examples thereof include a polyester polyol, acrylic polyol, polyether polyol, polyolefin polyol, fluorine polyol, polycarbonate polyol, epoxy resin and the like. Among them, as the polyol compound, an acrylic polyol, a polyester polyol, a polyether polyol, or a polycarbonate polyol is preferable, and an acrylic polyol is more preferable from the viewpoint of obtaining a film having excellent weather resistance and solvent resistance while maintaining good stretchability.

(Polyester Polyol)

The polyester polyol can be obtained, for example, by subjecting a dibasic acid alone or a mixture thereof, and a polyhydric alcohol alone or a mixture thereof to a condensation reaction.

Examples of the dibasic acid include carboxylic acids such as succinic acid, adipic acid, dimer acid, maleic anhydride, phthalic acid anhydride, isophthalic acid, terephthalic acid, 1,4-cyclohexanedicarboxylic acid or the like, and the like.

Examples of the polyhydric alcohol include ethylene glycol, propylene glycol, diethylene glycol, 1,4-butanediol, neopentyl glycol, 1,6-hexanediol, trimethylpentanediol, cyclohexanediol, trimethylolpropane, glycerin, pentaerythritol, 2-methylolpropanediol, ethoxylated trimethylolpropane and the like.

Specific examples of the method for producing a polyester polyol include a method in which the above components are mixed and then heated at about 160° C. or higher and 220° C. or lower to carry out a condensation reaction.

Alternatively, as a method for producing a polyester polyol, for example, a method of ring-opening polymerization of lactones such as &-caprolactone with a polyhydric alcohol to obtain polycaprolactones such as polycaprolactone diol can be mentioned, and the obtained polycaprolactones can be used as a polyester polyol.

These polyester polyols can be modified with aromatic diisocyanates, aliphatic diisocyanates, alicyclic diisocyanates and polyisocyanates obtained therefrom. In this case, aliphatic diisocyanates, alicyclic diisocyanates, and polyisocyanates obtained therefrom are particularly preferable from the viewpoint of weather resistance, yellowing resistance, and the like.

When the composition is used as an aqueous film-forming composition, a water-soluble or water-dispersible resin can be obtained by leaving some carboxylic acid such as the remaining dibasic acid and neutralizing it with a base such as amine or ammonia.

(Acrylic Polyol)

The acrylic polyol is not particularly limited, and examples thereof include a copolymer of a single compound of an ethylenically unsaturated bond-containing monomer having a hydroxyl group or mixture thereof, with a single compound of another ethylenically unsaturated bond-containing monomer or mixture thereof, which is copolymerizable with said single compound or mixture thereof, and the like.

The ethylenically unsaturated bond-containing monomer having a hydroxyl group is not particularly limited, and specific examples thereof include hydroxyethyl acrylate, hydroxypropyl acrylate, hydroxybutyl acrylate, hydroxyethyl methacrylate, hydroxypropyl methacrylate, hydroxybutyl methacrylate and the like. Among the examples, hydroxyethyl acrylate or hydroxyethyl methacrylate is preferable.

Examples of said another ethylenically unsaturated bond-containing monomer copolymerizable with the above-mentioned monomer include (metha) acrylic acid esters, unsaturated carboxylic acids, unsaturated amides, vinyl monomers having a hydrolyzable silyl group, other polymerizable monomers and the like. These may be used alone or in combination of two or more.

Examples of the (metha) acrylic acid esters include methyl acrylate, ethyl acrylate, isopropyl acrylate, acrylic acid-n-butyl, 2-ethylhexyl acrylate, methyl methacrylate, ethyl methacrylate, isopropyl methacrylate, methacrylic acid-n-butyl, isobutyl methacrylate, methacrylic acid-n-hexyl, cyclohexyl methacrylate, lauryl methacrylate, glycidyl methacrylate and the like.

Examples of unsaturated carboxylic acids include acrylic acid, methacrylic acid, maleic acid, itaconic acid and the like.

Examples of unsaturated amides include acrylamide, N-methylol acrylamide, diacetone acrylamide and the like.

Examples of vinyl monomers having a hydrolyzable silyl group include vinyltrimethoxysilane, vinylmethyldimethoxysilane, γ-(metha) acrylopropyltrimethoxysilane and the like.

Examples of other polymerizable monomers include styrene, vinyltoluene, vinyl acetate, acrylonitrile, dibutyl fumarate and the like.

For example, the acrylic polyol can be obtained by solution-polymerizing the above monomer component in the presence of a known radical polymerization initiator such as a peroxide or an azo compound, and if necessary, diluting with an organic solvent or the like.

An aqueous base acrylic polyol can be produced by a known method such as a method of solution-polymerizing an olefinically unsaturated compound to convert it into an aqueous layer or an emulsion polymerization. In this case, water solubility or water dispersibility can be imparted by neutralizing an acidic portion such as a carboxylic acid-containing monomer such as acrylic acid or methacrylic acid, or a sulfonic acid-containing monomer, with amine or ammonia.

(Polyether Polyol)

The polyether polyol is not particularly limited, and specific examples thereof include polyether polyols obtained by adding a single compound of alkylene oxide or a mixture thereof to a single polyvalent hydroxy compound or mixture in the presence of a strong basic catalyst; polyether polyols obtained by reacting a polyfunctional compound such as ethylenediamine with an alkylene oxide; and so-called polymer polyols obtained by polymerizing an acrylamide and the like using these polyethers as a medium.

Examples of the polyvalent hydroxy compound include diglycerin, ditrimethylolpropane, pentaerythritol, dipentaerythritol, sugar-alcohol compounds, monosaccharides, disaccharides, trisaccharides, tetrasaccharides and the like.

Examples of the sugar-alcohol-based compound include erythritol, D-threitol, L-arabinitol, ribitol, xylitol, sorbitol, mannitol, galactitol, ramnitol and the like.

Examples of the monosaccharides include arabinose, ribose, xylose, glucose, mannose, galactose, fructose, sorbose, rhamnose, fucose, ribodesose and the like.

Examples of the disaccharide include trehalose, sucrose, maltose, cellobiose, gentiobiose, lactose, melibiose and the like.

Examples of the trisaccharide include raffinose, gentianose, meletitos and the like.

Examples of the tetrasaccharide include stachyose and the like.

The strongly basic catalyst is not particularly limited, and specific examples thereof include hydroxides of alkali metals such as lithium, sodium, potassium or the like; alcoholates, alkylamines and the like.

Examples of the alkylene oxide include ethylene oxide, propylene oxide, butylene oxide, cyclohexene oxide, styrene oxide and the like.

(Polyolefin Polyol)

The polyolefin polyol is not particularly limited, and specific examples thereof include polybutadiene, hydrogenated polybutadiene, polyisoprene and hydrogenated polyisoprene having two or more hydroxy groups, and the like.

(Fluorine Polyol)

The fluorine polyol is a polyol containing fluorine in the molecule, and examples thereof include copolymers of fluoroolefins, cyclovinyl ethers, hydroxyalkyl vinyl ethers, monocarboxylic acid vinyl esters or the like, which are disclosed in JP S57-34107 (PTL 6), JP S61-275311 (PTL 7) or the like, and the like.

(Polycarbonate Polyol)

The polycarbonate polyol is not particularly limited, and specific examples thereof include those obtained by polycondensing a low-molecular-weight carbonate compound and the polyhydric alcohol used in the polyester polyol described above. The low-molecular-weight carbonate compound is not particularly limited, and specific examples thereof include a dialkyl carbonate such as dimethyl carbonate or the like; an alkylene carbonate such as ethylene carbonate or the like; a diaryl carbonate such as diphenyl carbonate or the like, and the like.

(Epoxy Resin)

The epoxy resin is not particularly limited, and specific examples thereof include a novolak type epoxy resin, glycidyl ether type epoxy resin, glycol ether type epoxy resin, aliphatic unsaturated compound epoxy type resin, epoxy type fatty acid ester, polyvalent carboxylic acid ester type epoxy resin, aminoglycidyl type epoxy resin, β-methylepichlo type epoxy resin, cyclic oxylan type epoxy resin, halogen type epoxy resin, resorcin type epoxy resin and the like.

(Hydroxy Group Value)

The hydroxy value of the polyol compound is preferably 5 mg KOH/g or more and 600 mg KOH/g or less, more preferably 10 mg KOH/g or more and 500 mg KOH/g or less, and even more preferably 15 mg KOH/g or more and 400 mg KOH/g or less, per 1 g of the polyol compound in terms of the crosslinking density and the mechanical properties of the film. In addition, the acid value of the polyol compound is preferably 0 mg KOH/g or more and 30 mg KOH/g or less. In addition, the hydroxy value and acid value can be determined based on the titration method.

[Polyamine Compound]

The polyamine compound is not particularly limited, and specific examples thereof include diamines, chain polyamines having three or more amino groups, and cyclic polyamines. Examples of the diamines include ethylenediamine, propylenediamine, butylenediamine, triethylenediamine, hexamethylenediamine, 4,4'-diaminodicyclohexylmethane, piperazine, 2-methylpiperazine, isophorone diamine and the like. Examples of the chain polyamines having three or more amino groups include bishexamethylenetriamine, diethylenetriamine, triethylenetetramine, tetraethylenepentamine, pentamethylenehexamine, tetrapropylenepentamine and the like. Examples of the cyclic polyamines include 1,4,7,10,13,16-hexaazacyclooctadecane, 1,4,7,10-tetraazacyclodecane, 1,4,8,12-tetraazacyclopentadecane, 1,4,8,11-tetraazacyclotetradecane and the like.

[Alkanolamine Compound]

The alkanolamine compound is not particularly limited, and specific examples thereof include monoethanolamine, diethanolamine, aminoethylethanolamine, N-(2-hydroxypropyl) ethylenediamine, mono-, di-(n- or iso-)propanolamine, ethylene glycol-bis-propylamine, neopentanolamine, methylethanolamine and the like.

[Polythiol Compound]

The polythiol compound is not particularly limited, and specific examples thereof include bis-(2-hydrothioethyroxy) methane, dithioethylene glycol, dithioerythritol, dithiothreitol and the like.

These active hydrogen-containing compounds may be used alone or in combination of two or more. Among them, as the active hydrogen-containing compound, since a film having excellent weather resistance and solvent resistance while maintaining good stretchability can be obtained, it is preferable that an acrylic polyol be used alone, or an acrylic polyol and a diol be used in combination. The term "diol" as used herein refers to a compound having two hydroxy groups in the above-mentioned polyol compounds. The "diol" is not particularly limited, and specific examples thereof include the compounds having two hydroxy groups among those listed in the examples of the polyhydric alcohols of "polyester polyol" or polycaprolactones, and examples of the "polycarbonate polyol".

[NCO/OH]

When the active hydrogen-containing compound is a polyol compound, the molar ratio (NCO/OH) of the isocyanate (—NCO) group of the polyisocyanate composition to the hydroxy (—OH) group of the polyol compound is preferably 0.2 or more and 5.0 or less, more preferably 0.4 or more and 3.0 or less, and even more preferably 0.5 or more and 2.0 or less. When the NCO/OH is at least the above lower limit, a tougher film tends to be obtained. When the NCO/OH is not more than the above upper limit, the smoothness of the obtained film tends to be further improved. The molar amount of the "isocyanate (—NCO) group of the polyisocyanate composition" used in the calculation of NCO/OH is the total molar amount of the isocyanate group not blocked by the blocking agent and the isocyanate group blocked by the blocking agent.

<Other Additives>

The film-forming composition of the present embodiment may contain various additives such as organic solvents, curing acceleration catalysts, antioxidants, ultraviolet absorbers, light stabilizers, pigments, leveling agents, plasticizers, surfactants or the like, and the like, according to the purpose and application.

The organic solvent preferably does not have functional groups that react with a hydroxy group and a isocyanate group, and is preferably sufficiently compatible with the polyisocyanate composition. Such an organic solvent is not particularly limited as along as it is a solvent generally used as a solvent for coating materials, and examples thereof include an ester compound, ether compound, ketone compound, aromatic compound, ethylene glycol dialkyl ether-based compound, polyethylene glycol dicarboxylate-based compound, hydrocarbon-based solvent and the like.

The curing acceleration catalyst is not particularly limited, and specific examples thereof include tin compounds, zinc compounds, titanium compounds, cobalt compounds, bismuth compounds, zirconium compounds, amine compounds and the like. Examples of the tin compound include dibutyltin dilaurate, dibutyltin diacetate, dioctyltin dilaurate, dimethyltin dineodecanoate, bis (2-ethylhexanoic acid) tin and the like. Examples of the zinc compound include zinc 2-ethylhexanoate, zinc naphthenate and the like. Examples of the titanium compound include titanium 2-ethylhexanoate, titanium diisopropoxybis (ethylacetonate) and the like. Examples of the cobalt compound include cobalt 2-ethylhexanoate, cobalt naphthenate and the like. Examples of the bismuth compound include bismuth 2-ethylhexanoate, bismuth naphthenate and the like. Examples of the zirconium compound include zirconium tetraacetylacetonate, zirconyl 2-ethylhexanoate, zirconyl naphthenate and the like.

The antioxidant is not particularly limited, and specific examples thereof include hindered phenol-based compounds, phosphorus-based compounds, sulfur-based compounds and the like.

The ultraviolet absorber is not particularly limited, and specific examples thereof include benzotriazole-based compounds, triazine-based compounds, benzophenone-based compounds and the like.

The light stabilizer is not particularly limited, and specific examples thereof include hindered amine compounds, benzotriazole compounds, triazine compounds, benzophenone compounds, benzoate compounds and the like.

The pigment is not particularly limited, and specific examples thereof include titanium oxide, carbon black, indigo, pearl mica, aluminum and the like.

The leveling agent is not particularly limited, and specific examples thereof include silicone oil and the like.

The plasticizer is not particularly limited, and specific examples thereof include phthalic esters, phosphoric acid-based compounds, polyester-based compounds and the like.

The surfactant is not particularly limited, and specific examples thereof include known anionic surfactants, cationic surfactants, amphoteric surfactants and the like.

<Method for Producing Film-Forming Composition>

When the film-forming composition of the present embodiment is an organic solvent-based composition, the organic solvent-based film-forming composition can be obtained by first adding the polyisocyanate composition as a curing agent to an active hydrogen-containing compound or a solvent dilution thereof in which additives such as resins, catalysts, pigments, leveling agents, antioxidants, ultraviolet absorbers, light stabilizers, plasticizers, surfactants or the like are added if necessary, then further adding an organic solvent if necessary to adjust the viscosity, then stirring by hand or using a stirring device such as mazelar.

When the film-forming composition of the present embodiment is an aqueous composition, the aqueous film-forming composition can be obtained by first adding additives such as curing agents that can react with the crosslinkable functional groups in the active hydrogen-containing compound, other resins, catalysts, pigments, leveling agents, antioxidants, UV absorbers, light stabilizers, plasticizers, surfactants or the like to the active hydrogen-containing compound, or aqueous dispersion or water-soluble substance thereof, if necessary, then adding the polyisocyanate composition or aqueous dispersion thereof as a curing agent, and if necessary, further adding water or a solvent to adjust the viscosity, then, stirring forcibly with a stirring device.

<<Primary Cured Film F1 and Secondary Cured Film F2>>

The primary cured film of the present embodiment is formed by curing a polyisocyanate composition including at least one isocyanate compound selected from the group consisting of an aliphatic isocyanate and an alicyclic isocyanate as a skeleton, and an active hydrogen-containing composition, and contains at least one functional group X selected from the group consisting of a urethane group, a urea group, and an amide group produced by curing the active hydrogen-containing compound and the polyisocyanate composition, an active hydrogen group, and an isocyanate group blocked with a blocking agent.

The primary cured film of the present embodiment is obtained by curing the above-mentioned film-forming composition. The primary cured film of the present embodiment has excellent blocking resistance while maintaining good stretchability.

The primary cured film of the present embodiment is obtained by coating the film-forming composition to a substrate or the like and curing it at room temperature or by heating. Specifically, the isocyanate group of the polyisocyanate composition in the film-forming composition reacts with the active hydrogen of the active hydrogen-containing compound to form a primary cured film. At this time, since the blocked isocyanate groups are retained as they are, the stretchability at the time of attaching the primary cured film is sufficiently exhibited. Further, by attaching the primary cured film to various base materials and then heating it again, the blocking agent bonded to the isocyanate group is dissociated to further form a crosslink. By this crosslinking formation, the crosslinking density of the film is improved, and a secondary cured film exhibiting weather resistance and solvent resistance can be obtained.

As the coating methods, a reverse roll coating method, gravure coating method, kiss coating method, die coater method, roll brushing method, spray coating method, air knife coating method, wire bar coating method, pipe doctor method, impregnation coating method, curtain coating method, roll coating method, curtain flow coating method, spray coating method, bell coating method, electrostatic coating method and the like can be used.

The thickness of the primary cured film is not particularly limited, and it is preferably 0.2 μm or more and 500 μm or less, more preferably 1 μm or more and 500 μm or less, even more preferably 5 μm or more and 300 μm or less, and particularly preferably 5 μm or more and 100 μm or less.

For the production of the primary cured film and the secondary cured film in the present embodiment, the above-described film-forming composition containing the polyisocyanate composition and an active hydrogen-containing composition is preferable. By using the above-described film-forming composition, a primary cured film containing a crosslinked structure formed by a reaction of an isocyanate group and an active hydrogen group, an active hydrogen group, and an isocyanate group blocked with a blocking agent can be obtained. Due to the crosslinked structure contained in the primary cured film, the handling property of the obtained film at room temperature, namely, the blocking resistance at room temperature can be further improved. Further, the active hydrogen group and the isocyanate group blocked with the blocking agent contained in the primary cured film make it possible to further crosslink the primary cured film, and a secondary cured film having excellent solvent resistance can be obtained.

The functional group forming a crosslinked structure formed by a reaction of an isocyanate group and an active hydrogen group (hereinafter, referred to as functional group X) is not particularly limited, and preferably includes at least one selected from a urethane group, a urea group and an amide group.

In the primary cured film of the present embodiment, the ratio $\gamma/\beta$ between the molar amount $\gamma$ of the functional group X and the molar amount $\beta$ of the isocyanate group blocked with a blocking agent contained in 1 kg of the primary cured film may be 0.02 or more and 9.0 or less. $\gamma/\beta$ is preferably 0.1 or more 2.4 or less, more preferably 0.1 or more and 1.0 or less, particularly preferably 0.2 or more and 1.0 or less. When $\gamma/\beta$ is not less than the lower limit, handling property of the obtained film at room temperature, namely, blocking resistance at room temperature can be improved. On the other hand, when $\gamma/\beta$ is not more than the upper limit, good stretchability of the film can be maintained.

Further, in the primary cured film of the present embodiment, the ratio $\gamma/\alpha$ between the molar amount $\gamma$ of the functional group X and the molar amount $\alpha$ of the active hydrogen group contained in 1 kg of the primary cured film may be 0.1 or more and 9.0 or less. $\gamma/\alpha$ is preferably 0.1 or more and 2.4 or less, preferably 0.1 or more and 1.0 or less, and particularly preferably 0.2 or more and 1.0 or less.

In the primary cured film of the present embodiment, the ratio $\beta/\alpha$ between the molar amount $\beta$ of the isocyanate group blocked with a blocking agent and the molar amount $\alpha$ of the active hydrogen group contained in 1 kg of the primary cured film may be 0.02 or more and 20 or less. $\beta/\alpha$ is preferably 0.1 or more and 10 or less, more preferably 0.2 or more and 5.0 or less, and particularly preferably 0.5 or more and 2.0 or less.

Further, the ratio $\gamma/\gamma'$ between the molar amount $\gamma$ of the functional group X contained in 1 kg of the primary cured film and the molar amount $\gamma'$ of the functional group X contained in 1 kg of the secondary cured film may be 0.1 or more and 0.9 or less. $\gamma/\gamma'$ is preferably 0.1 or more and 0.7 or less, more preferably 0.1 or more and 0.5 or less, and particularly preferably 0.2 or more and 0.5 or less. When $\gamma/\gamma'$ is not less than the above lower limit, handling property at room temperature of the obtained film, namely blocking resistance at room temperature can be improved. On the other hand, when $\gamma/\gamma'$ is not more than the upper limit, good stretchability of the film can be maintained.

In the primary cured film of the present embodiment, the molar amount $\gamma$ of the functional group X contained in 1 kg of the primary cured film and the molar amount $\gamma'$ of the functional group X contained in the secondary cured film are in the following ranges.

1) The molar amount $\gamma$ of the functional group X contained in 1 kg of the primary cured film is 0.05 or more and 1.0 or less. $\gamma$ is preferably 0.05 or more and 0.8 or less, more preferably 0.07 or more and 0.6 or less, and particularly preferably 0.1 or more and 0.4 or less. When $\gamma$ is not less than the lower limit, a self-supporting film having a constant crosslink density can be obtained. On the other hand, when $\gamma$ is not more than the upper limit, stretchability of the primary cured film can be maintained.

2) The molar amount $\gamma'$ of the functional group X contained in 1 kg of the secondary cured film is 0.3 or more 10 or less. $\gamma'$ is preferably 0.3 or more and 5.0 or less, more preferably 0.5 or more and 2 or less, and particularly preferably 0.5 or more and 1.2 or less. When $\gamma'$ is not less than the above lower limit, the crosslinking density of the secondary cured film can be improved and solvent resistance can be exhibited. In addition, when $\gamma'$ is not more than the upper limit, good mechanical properties of the secondary cured film can be maintained.

In the present embodiment, the tensile elastic modulus of the primary cured film can be obtained by using a stress-strain curve when the measurement temperature is the glass transition temperature of the film+10° C., and the tensile speed is 100%/min. The tensile elastic modulus of the primary cured film is preferably 0.1 MPa or more and 3.0 MPa or less when calculated from the inclination of the linear relationship between the stress and strain in the region of 5% to 10% of elongation. When the tensile elastic modulus is not more than the upper limit, good stretchability can be obtained, and when it is not more than the lower limit, the strength of the film required at the time of stretching can be maintained. The tensile elastic modulus is preferably 0.2 MPa or more and 1.5 Mpa or less, more preferably 0.3 MPa or more and 1.1 MPa or less, particularly preferably 0.4 MPa or more and 0.7 MPa or less.

<Method of Use of Primary Cured Film F1>

As described above, the primary cured film of the present embodiment is used by being attached to the surface of a preformed base material, or by being attached to the surface at the same time as molding an article by a known molding method. Then, the molded product to which the primary cured film is attached is further heated to cure the attached primary cured film, whereby a molded product protected by the film having high solvent resistance can be obtained.

In both cases, the film may be attached to the surface of the base material by using a known attachment method. Specific examples of the former include vacuum molding, air-compressed molding, vacuum/air-compressed molding, laminating and the like. Specific examples of the latter include in-mold forming, film insert molding and the like.

Among the methods, vacuum/air-compressed molding, in-mold forming, and film insert molding, which require particularly high stretchability, are preferable, and if a base material is preformed, vacuum/air-compressed molding where a film can be attached regardless of the material is more preferable.

The method of attaching the primary cured film is not particularly limited, but from the viewpoint of the film's followability to the molded product, it is preferable to attach the primary cured film so as to follow the molded product while heating it at 50° C. or higher and 140° C. or lower. When the heating temperature is not lower than the lower limit, the film can be more closely followed and attached to the molded product. Further, when the heating temperature is higher than the upper limit, dissociation of the isocyanate group blocked with a blocking agent contained in the primary cured film can be prevented.

It is desirable that the heating temperature for further curing the attached primary cured film be 50° C. or higher and 180° C. or lower. The heating temperature is preferably 50° C. or higher and 170° C. or lower, more preferably 50° C. or higher and 160° C. or lower, and particularly preferably 100° C. or higher and 150° C. or lower. When the heating temperature is in the above range, the isocyanate group blocked with a blocking agent is dissociated, a crosslink is formed by the reaction with the active hydrogen group, and a film having high solvent resistance is obtained.

<<Primary Cured Film F1' and Secondary Cured Film F2'>>

The primary cured film of the present embodiment contains a crosslinked structure and a curable functional group A. By having a crosslinked structure, it is possible to have the strength of a self-supporting film, and exhibit the handleability of the film, namely, the blocking resistance. Furthermore, since the functional group A is contained, the primary cured film can be cured after the film is attached, and even if the crosslinking density is lowered to such an extent that the stretchability at the time of film attachment is sufficiently exhibited, weather resistance and solvent resistance of the final film can be ensured.

As described above, the primary cured film F1' in the present embodiment is obtained by coating a film-forming composition to a substrate or the like, applying an external stimulus, and then curing the film. At this time, by holding the reactive functional groups contained in a state in which some of them remain, the stretchability at the time of film-attaching can be sufficiently exhibited. Then, by applying an external stimulus to the primary cured film, the reactive functional groups remaining in the primary cured film further promote the curing, and a secondary cured film is obtained.

The crosslinked structure contained in the primary cured film F1' is not particularly limited, and may be formed by a known crosslinked reaction using polycondensation, polyaddition, various polymerization reactions and the like. Specifically, crosslinking by polymerization of a compound having a carbon unsaturated bond represented by a vinyl group or a (metha) acrylic group, crosslinking by ring-opening polymerization of a cyclic compound represented by ethylene oxide, crosslinking via an amide bond (polyamide), crosslinking via an ester bond (polyester), crosslinking via a melamine bond (melamine resin), crosslinking via a carbonate bond (polycarbonate), crosslinking via a urethane bond (polyurethane), crosslinking via a urea bond (polyurea), crosslinking via a silicone bond (silicone resin), crosslinking by condensation of phenol and formaldehyde (phenol resin), crosslinking by condensation of urea and formaldehyde (urea resin), crosslinking by a reaction of epoxy resin with a curing agent such as an amine, amide, acid, acid anhydride or the like, crosslinking via an imino bond (polyaniline) and the like can be mentioned. Among them, crosslinking via a urethane bond, crosslinking via a urea bond, crosslinking via an amide bond, and crosslinking by polymerization of a (metha) acrylic group are preferable, and crosslinking via a urethane bond is particularly preferable.

Similarly, the curable functional group A contained in the primary cured film is not particularly limited as long as a functional group necessary for the known curing reaction is contained. Therefore, the functional group A may be a single functional group, and may also be a combination of a plurality of functional groups if necessary. Specific examples of the functional group in which the curing reaction proceeds even if it is a single group include a vinyl group, a (metha) acrylic group, a silanol group and the like. Among the examples, a (metha) acrylic group is preferable.

In addition, as a combination of the functional groups in which the curing reaction proceeds with a plurality of functional groups, "active hydrogen group and isocyanate group", "carboxy group and hydroxy group", "epoxy group with amino group, acid, or acid anhydride", "amino group and formyl group (aldehyde group)" and the like can be mentioned. Among the combinations, the combination of "active hydrogen group and isocyanate group" is preferable.

In addition, the crosslinked structure contained in the primary cured film and the crosslinked structure formed by the functional group A may be the same or different.

In addition, the compound having a curable functional group A may be a compound having no reactive functional group as long as it has reactivity when an external stimulus described later is applied. The compound is also not particularly limited, and examples thereof include acid anhydrides, blocked isocyanate compounds and the like.

The crosslinked structure is formed at room temperature or by applying some external stimulus. Specific types of external stimuli include heating, activation energy ray irradiation, moisture, vibration, electric field, magnetic field, pressure, pH change and the like. For the formation of the crosslinked structure contained in the primary cured film, heating, activation energy ray irradiation, and moisture are preferable, heating and active energy ray irradiation are more preferable, and heating is even more preferable, from the viewpoint of versatility and productivity of the process equipment.

Further, for the formation of the crosslinked structure by the functional group A, it is desirable that the crosslinked formation not start in the state where the film is stored from the viewpoint of using method. Further, from the viewpoint of forming a crosslink after being attached to the structure, in order to efficiently form a crosslinked structure, heating and irradiation with active energy rays are preferable.

The secondary cured film is obtained by reacting the curable functional group A contained in the primary cured film.

By the reaction of the functional group A, the crosslink density of the film is improved, and weather resistance and solvent resistance are exhibited.

<Film-Forming Composition>

The film-forming composition of the present embodiment contains a compound having a crosslinked structure or a compound capable of forming a crosslinked structure, and the above-mentioned curable functional group A. By applying this film-forming composition to a substrate or the like, and if necessary, applying an external stimulus such as heating, a primary cured film containing a crosslinked structure and a curable functional group A can be obtained.

<Method of Use of Primary Cured Film F1'>

The primary cured film of the present embodiment is used by being attached to the surface of a preformed base material, or by being attached to the surface at the same time as molding an article by a known molding method. Then, the molded product to which the primary cured film is attached is further heated to cure the attached primary cured film, whereby a molded article protected by the film having high solvent resistance can be obtained.

Regarding the attachment of the film, the film may be attached to the surface of the base material by using a known method. The method is not particularly limited, and examples of the attaching method to a preformed base material include vacuum molding, air-compressed molding, vacuum/air-compressed molding, lamination and the like. Further, as the method of attaching the film at the same time as molding, in-mold forming, film insert molding and the like can be mentioned.

Among the methods, vacuum/air-compressed molding, in-mold forming, and film insert molding, which require particularly high stretchability, are preferable, and if a base material is preformed, vacuum/air-compressed molding where a film can be attached regardless of the material is more preferable.

<<Film Laminate>>

The film laminate of the present embodiment is a film laminate having at least two types of layers selected from the group consisting of a substrate layer, a decorative layer, and an adhesive layer. Among the layers constituting the film laminate, at least one type of layer contains the primary cured film F1 or F1'. The film laminate of the present embodiment has excellent blocking resistance and solvent resistance.

In the film laminate of the present embodiment, the film may be contained in any one of the substrate layer and the decorative layer, or may be contained in both layers. Further, the film laminate of the present embodiment may include one layer (single layer) of the film or plural (two or more) layers of the film in one type of layer constituting the film laminate.

<Decemberorative Layer>

The decorative layer is not particularly limited, and specific examples thereof include a colored layer, a pattern layer and the like. The decorative layer may be composed of one layer (single layer) or may be composed of two or more layers. When the decorative layer is composed of a plurality of layers, the composition, shape and thickness of the plurality of layers may be the same as or different from each other, and the combination of the plurality of layers is not particularly limited as long as the effects of the present invention are not impaired.

In addition, in the present specification, not only in the case of the decorative layer, the phrase "a plurality of layers may be the same as or different from each other" means "all layers are the same, or all layers are different, or only some layers are the same", and the phrase "plural layers are different from each other" means "at least one of the composition, shape and thickness of each layer is different from each other".

The thickness of the decorative layer is not particularly limited, and it is preferably 0.2 μm or more and 100 μm or less. The "thickness of the decorative layer" here means the thickness of the entire decorative layer. For example, the thickness of a decorative layer composed of a plurality of layers means the total thickness of all the layers constituting the decorative layer.

[Colored Layer]

The colored layer is a layer exhibiting a coating color, a metallic color or the like. Examples of the colorant contained in the colored layer include inorganic pigments, organic pigments, aluminum bright materials, pigments dispersed in a binder resin, and printing inks. Examples of the inorganic pigment include titanium oxide, carbon black, chrome yellow, yellow iron oxide, bengala, red iron oxide and the like. Examples of the organic pigment include phthalocyanine pigments, azo lake pigments, indigo pigments, perinone pigments, perylene pigments, quinophthalone pigments, dioxazine pigments, quinacridone pigments and the like. Examples of the phthalocyanine pigment include phthalocyanine blue, phthalocyanine green and the like. Examples of the quinacridone pigment include quinacridone red and the like. Examples of the aluminum glittering material include aluminum flakes, vapor-deposited aluminum flakes, metal oxide-coated aluminum flakes, colored aluminum flakes and the like. Examples of the pigment dispersed in the binder resin include a pearl bright material such as a flake-shaped mica coated with a metal oxide such as titanium oxide, iron oxide or the like, synthetic mica and the like. Examples of the binder resin in which the pigment is dispersed include an acrylic resin, a polyurethane resin and the like.

[Pattern Layer]

The pattern layer is a layer that imparts a pattern such as a wood grain, a geometric pattern, a leather pattern or the like, a logo, a picture pattern, or the like to an article. The method for forming the pattern layer is not particularly limited, and specific examples thereof include a known printing method, a known coating method, punching, etching and the like. Examples of the printing method include gravure direct printing, gravure offset printing, inkjet printing, laser printing, screen printing and the like. Examples of the coating method include gravure coating, roll coating, die coating, bar coating, knife coating and the like.

Further, the material of the pattern layer may be a film made of the above-mentioned film-forming composition, a film or sheet made of other resins, or a metal foil.

<Substrate Layer>

The substrate layer serves as a support layer for the decorative layer, and can also function as a protective layer that provides uniform elongation during the molding and more effectively protects the structure from external punctures, impacts and the like. The substrate layer may be composed of one layer (single layer) or may be composed of two or more layers. When the substrate layer is composed of a plurality of layers, the composition, shape and thickness of the plurality of layers may be the same as or different from each other, and the combination of the plurality of layers is not particularly limited as long as the effects of the present invention are not impaired.

The substrate layer is not particularly limited, and examples thereof include layers formed by molding a material such as a resin, a metal (steel plate, surface-treated steel plate, etc.), wood, an inorganic material (glass, etc.), or layers formed by molding the above-mentioned film-forming composition. Examples of the resin include acrylic resins containing polymethylmethacrylate, polyurethanes, polyvinyl chlorides, polycarbonates, polyolefins, polyesters, acrylonitrile-butadiene-styrene copolymers, ethylene-acrylic acid copolymers, ethylene-ethyl acrylate copolymers, ethylene-vinyl acetate copolymers and the like. Examples of the polyolefin include a polyethylene, polypropylene and the like. Examples of the polyester include a polyethylene terephthalate, polyethylene naphthalate and the like.

The thickness of the substrate layer is not particularly limited, and from the viewpoint of not adversely affecting the moldability of the decorative layer and imparting the function of the substrate layer to the film, it is preferably 2 μm or more and 500 μm or less, and more preferably 5 μm or more and 200 μm. The "thickness of the substrate layer" here means the thickness of the entire substrate layer. For example, the thickness of the substrate layer composed of a plurality of layers means the total thickness of all the layers constituting the substrate layer.

<Adhesive Layer>

The film laminate of the present embodiment may further include an adhesive layer between the substrate layer and the decorative layer, or between the layers constituting the substrate layer or the decorative layer when the substrate layer and the decorative layer are composed of a plurality of layers. The adhesive layer may be composed of one layer (single layer) or may be composed of two or more layers. When the adhesive layer is composed of a plurality of layers, the composition, shape and thickness of the plurality of layers may be the same as or different from each other, and the combination of the plurality of layers is not particularly limited as long as the effects of the present invention are not impaired. The adhesive agent contained in the adhesive layer is not particularly limited, and may be any generally used adhesive agent, and specific examples thereof include acrylic-based, polyolefin-based, polyurethane-based, polyester-based or rubber-based, solvent type, emulsion type, pressure-sensitive type, heat-sensitive type, thermosetting type or UV-curable type adhesive agents.

The thickness of the adhesive layer is not particularly limited, and from the viewpoint of not adversely affecting the moldability of the decorative layer and imparting the function of the substrate layer to the film, it is preferably 2 µm or more and 200 µm or less, and preferably 5 µm or more and 100 µm or less. The phrase "thickness of the adhesive layer" here means the thickness of the entire adhesive layer. For example, the thickness of the adhesive layer composed of a plurality of layers means the total thickness of all the layers constituting the adhesive layer.

<<Adhesive Resin Composition>

The adhesive resin composition of the present embodiment contains the following component 1), or components 1) and 2).

1) The polyisocyanate composition described in the above <<Polyisocyanate composition>>;
2) Active hydrogen-containing compound According to the adhesive resin composition of the present embodiment, by containing the above-mentioned polyisocyanate composition in the adhesive resin composition, it is possible to provide an adhesive resin-cured product having excellent solvent resistance before lamination, excellent adhesion to various functional layers used as an upper layer, and excellent stability under high temperature and high humidity. The "adhesive resin cured product" referred to here is a product obtained by curing the adhesive resin composition of the present embodiment. That is, as one embodiment, the present invention provides an adhesive resin-cured product obtained by curing the above-mentioned adhesive resin composition.

<Active Hydrogen-Containing Compound>

The active hydrogen-containing compound is as described in the above <Active hydrogen-containing compound>.

Further, the adhesive resin composition of the present embodiment may contain other crosslinking agent components in addition to the above-mentioned polyisocyanate composition.

<Other Crosslinking Agent Components>

Examples of other crosslinking agents include epoxy compounds, oxazoline compounds, melamine compounds, carbodiimide compounds and the like.

The epoxy compound is not particularly limited as long as it is a resin having two or more epoxy groups in one molecule, and a known resin known can be used. Examples of the epoxy compound include a bisphenol type epoxy compound obtained by adding epichlorohydrin to bisphenol, a novolak type epoxy compound obtained by adding epichlorohydrin to a phenol novolak resin, and a polyethylene glycol diglycidyl ether and the like. The epoxy compound can be used after being dispersed in water, if necessary.

Examples of the oxazoline compound include a polymer-like compound having at least two oxazoline groups in the side chain, and a monomer compound having at least two oxazoline groups in one molecule.

Examples of the melamine compound include a partially or completely methylolated melamine resin obtained by reacting melamine with an aldehyde, and the like. Examples of the aldehyde include formaldehyde, paraformaldehyde and the like. Further, a compound in which the methylol group of the methylolated melamine resin is partially or completely etherified with alcohol can also be used. Examples of the alcohols used for etherification include methanol, ethanol, n-propanol, isopropanol, n-butanol, isobutanol, 2-ethylbutanol, 2-ethylhexanol and the like.

Specific examples of the melamine compound include Cymel 303, Cymel 323, Cymel 325, Cymel 327, Cymel 350, Cymel 370, Cymel 380, Cymel 385, Cymel 212, Cymel 251, Cymel 254 and Mycoat 776 (all are trade names) manufactured by Cytec Industries, Inc. of Japan, and the like.

The carbodiimide compound can be obtained, for example, by decarbonating the isocyanate group of the polyisocyanate compound. Examples of commercially available carbodiimide compounds include carbodilite V-02, carbodilite V-02-L2, carbodilite V-04, carbodilite E-01, carbodilite E-02 (all are manufactured by Nisshinbo, Inc., trade names).

The adhesive resin composition of the present embodiment can be used as a coating liquid diluted with, for example, various solvents, water, etc., from the viewpoint of workability when applied to an adherend and ease of thinning. As the solvent that can be used, for example, ketones such as acetone, methyl ethyl ketone, methyl isobutyl ketone or the like, esters such as ethyl acetate, n-butyl acetate, cellosolve acetate or the like, and the like can be appropriately selected and used according to the purpose and use. These solvents may be used alone or in combination of two or more.

The solid content concentration of the adhesive resin composition of the present embodiment is not particularly limited, and is preferably 10% by mass or more and 80% by mass or less, more preferably 15% by mass or more and 60% by mass or less, even more preferably 20% by mass or more and 50% by mass or less, and particularly preferably 25% by mass or more and 40% by mass or less, with respect to the total mass of the adhesive resin composition.

<Usage>

Examples of the fields in which the adhesive resin composition of the present embodiment is used include automobiles, building materials or home appliances, woodworking, and laminates for solar cells. Among them, since optical members for liquid crystal displays of home appliances such as televisions, personal computers, digital cameras, mobile phones or the like exhibit various functions, it is necessary to laminate films and plates of various adherends. Since sufficient adhesion is required between the films and plates of various adherends, it is preferable as an example of using the adhesive resin composition of the present embodiment.

[Adherend]

Examples of the adherend that can be used for the adhesive resin composition of the present embodiment include glass, various metals such as aluminum, iron, zinc steel sheet, copper, stainless steel or the like; porous members such as mortar, stone or the like; fluorine-coated, urethane-coated, acrylic-urethane-coated members; silicone-based, modified silicone-based, and urethane-based sealant-cured products; rubbers such as vinyl chloride, natural rubber, synthetic rubber or the like; films and plates of resins such as polyester, acrylic, polycarbonate, triacetyl cellulose, polyolefin or the like; UV-curable acrylic resin layers; layers made of inks such as printing inks, UV inks or the like; and the like. Among them, films and plates of resins such as polyester, acrylic, polycarbonate, triacetyl cellulose, polyolefin or the like, or UV-curable acrylic resin layers are preferable.

Hereinafter, a case where the adherend is a polyester film will be described as an example.

Examples of the polyester resin constituting the polyester film used as the adherend of the adhesive resin composition of the present embodiment include polyethylene terephthalate, polypropylene terephthalate, polybutylene terephthalate, polyethylene naphthalate, polymethylene terephthalate, and a polyester resin obtained by coplymerizing, as copolymer components, a diol component such as diethylene glycol, neopentyl glycol, polyalkylene glycol or the like, a dicarboxylic acid component such as adipic acid, sebacic acid, phthalic acid, isophthalic acid, 2,6-naphthalenedicarboxylic acid or the like, and the like. Among them, as the polyester resin, it is preferable that at least one selected from the group consisting of polyethylene terephthalate, polypropylene terephthalate, polybutylene terephthalate, and polyethylene naphthalate be mainly used as a constituent component. Further, among these polyester resins, polyethylene terephthalate is most preferable from the viewpoint of the balance between physical properties and cost. Further, these polyester films or polyester plates are preferably biaxially stretched from the viewpoint of improving chemical resistance, heat resistance, mechanical strength and the like.

Further, various additives may be contained in the polyester resin, if necessary. Examples of the additives include an antioxidant, an organic lubricant, an antistatic agent, an ultraviolet absorber, a surfactant and the like.

The thickness of the polyester film is preferably 10 μm or more and 400 μm or less, more preferably 20 μm or more and 300 μm or less, and even more preferably 30 μm or more and 200 μm or less in order to obtain the strength required for use as an optical member. The thickness of the polyester plate is not particularly limited, and is preferably 1 mm or more and 10 mm or less, more preferably 2 mm or more and 8 mm or less, and even more preferably 3 mm or more and 5 mm or less. In the present specification, a film and a plate are distinguished by thickness, and a film having a thickness of 500 μm or less is defined as a film, and a film having a thickness of more than 500 μm is defined as a plate.

<Method of Use of Adhesive Resin Composition>

The method of use of the adhesive resin composition of the present embodiment will be described.

Examples of the method of use of the adhesive resin composition of the present invention include a method including a step of applying the adhesive resin composition of the present embodiment to at least one adherend, a step of laminating the adherend coated with the adhesive resin composition with another adherend, and if necessary, a step of heating and adhering the laminate in which the adherends are laminated.

Further, when the adhesive resin composition is used for film-lamination of an optical member, a method of applying the adhesive composition of the present embodiment to an adherend such as polyester film or the like in advance to form an easy-adhesion-treated layer, then performing a heat treatment step, and then laminating the other adherend, a method of further applying the adhesive resin composition of the present embodiment to a film provided with an easy-adhesion-treated layer, followed by laminating, or the like can be used. The adhesive resin composition of the present embodiment is effective for any of these methods.

As a method for applying the coating liquid containing the adhesive resin composition of the present embodiment to a film or the like, any known method can be used. For example, a roll coating method, a gravure coating method, a roll brushing method, a spray coating method, an air knife coating method, a curtain coating method and the like can be mentioned. These methods can be applied alone or in combination.

The coating amount of the coating liquid is not particularly limited, and the thickness after drying is preferably 0.01 μm or more and 1 μm or less, more preferably 0.02 μm or more and 0.5 μm or less, and even more preferably 0.04 μm or more and 0.3 μm or less.

Inorganic particles such as silica, talc or the like, and organic particles such as acrylic, urethane, polyester or the like can also be mixed in the coating liquid. Further, a surfactant, an antifoaming agent, an antiseptic agent, an antistatic agent and the like can also be mixed in the coating liquid.

Hereinafter, the method of forming the coating layer will be described by taking as an example the case of producing an easy-adhesion-treated polyester film.

The adhesive resin composition of the present embodiment is used as a cross-linking agent component for an easy-adhesion-treated layer (namely, an adhesive layer preformed on the film substrate for adhesion to the adherend) applied to the surface of the polyester film in order to improve the adhesion between the polyester film and various adherends. For example, when used for an easy-adhesion-treated polyester film, the easy-adhesion-treated layer is mainly formed by the following two methods. The first method is an in-line coating method in which the polyester film before the completion of crystal orientation is coated with a coating liquid containing the necessary components, then dried, stretched in at least a uniaxial method, and then heat-treated to complete the orientation of the polyester film. The second method is an offline coating method in which the polyester film is manufactured, then a coating liquid is applied to the film, and then the film is dried. Generally, the in-line coating method is preferable from the viewpoint of production efficiency in which a coating layer is formed at the same time as polyester film production.

(Method for Producing Easy-Adhesion-Treated Polyester Film)

A method for producing an easy-adhesion-treated polyester film using the adhesive resin composition of the present embodiment as an easy-adhesion-treated layer will be described.

First, the polyester that constitutes the film is melt-extruded into a film, and then cooled and solidified to obtain an unstretched polyester film. A biaxially stretched polyester film can be obtained by stretching this unstretched film at Tg to (Tg+50)° C. in the longitudinal direction so as to be 3 times or more and 5 times or less, and then stretching at Tg to (Tg+50)° C. in the width direction so as to be 3 times or more and 5 times or less, or simultaneously stretching in the longitudinal direction and the width direction, and then performing a heat treatment at 140° C. or higher and 230° C. or lower for 1 second or longer and 60 seconds or lower.

Conventionally, the heat history in the heat treatment process is about 1 minute at 200° C., but from the viewpoint of protecting the global environment and improving productivity, it is desired to lower the temperature of the heat treatment process. Therefore, it is considered to lower the temperature to 150° C. about 1 minute as a heat history. When a conventional adhesive composition is used for the easy-adhesion-treated layer, the initial adhesion and the adhesion after the moisture and heat resistance test may decrease. Therefore, there is a strong demand for an adhesive composition capable of exhibiting initial adhesion and adhesion after the moisture and heat resistance test even in a low-temperature heat treatment step. In order to exhibit adhesion in a heat treatment step of about 1 minute at 150° C., it is preferable that crosslinks be formed at a temperature lower than that of blocked polyisocyanate. Specifically, a crosslinking agent capable of crosslinking at 60° C. or lower (the crosslinking reaction is started at 60° C. or lower) is preferable.

The formation of the easy-adhesion-treated polyester film by applying the adhesive resin composition of the present embodiment can be carried out at any stage, and it is preferable that the coating liquid be applied before stretching or after uniaxial stretching, then dried, stretched at least in the uniaxial direction, and then heat-treated to complete the coating. Further, the coating liquid may be applied to only one side, and there is no particular problem even if it is applied to both sides.

<<Coating Composition>>

The coating composition of the present embodiment contains the following components 1), or components 1) and 2).
1) The polyisocyanate composition described in the above <<Polyisocyanate composition>>;
2) Active hydrogen-containing compound According to the coating composition of the present embodiment, by containing the above-mentioned polyisocyanate composition, it is possible to provide a coating material-cured product having excellent solvent resistance of the coating film and a good pot life of the coating material. The term "coating material-cured product" as used herein means a product obtained by curing the coating composition of the present embodiment. That is, as one embodiment, the present invention provides a coating material-cured product obtained by curing the above-mentioned coating composition.

<Active Hydrogen-Containing Compound>

The active hydrogen-containing compound is as described in the above <Active hydrogen-containing compound>.

Further, the coating composition of the present embodiment may contain other crosslinking agent components in addition to the above-mentioned polyisocyanate composition.

<Other Crosslinking Agent Components>

Other crosslinking agent components are as described in the above <Other crosslinking agent components>.

The coating composition of the present embodiment can be used as a coating liquid diluted with, for example, various solvents, water, etc., from the viewpoint of workability when applied to an object to be coated and ease of thinning. As the solvent that can be used, for example, ketones such as acetone, methyl ethyl ketone, methyl isobutyl ketone or the like, esters such as ethyl acetate, n-butyl acetate, cellosolve acetate or the like, and the like can be appropriately selected and used according to the purpose and use. These solvents may be used alone or in combination of two or more.

The solid content concentration of the coating composition of the present embodiment is not particularly limited, and from the viewpoint of easy viscosity adjustment, it is preferably 10% by mass or more and 90% by mass or less, more preferably 25% by mass or more and 80% by mass or less, even more preferably 35% by mass or more and 75% by mass or less, and particularly preferably 40% by mass or more and 70% by mass or less, with respect to the total mass of the coating composition.

The coating composition can be baked under any temperature condition to accelerate curing. As a recent trend, there has been a demand for a coating composition that cures at a lower temperature from the viewpoint of reducing thermal energy in equipment. The baking temperature is preferably in the range of 40° C. or higher and 200° C. or lower, more preferably 60° C. or higher and 180° C. or lower, even more preferably 80° C. or higher and 160° C. or lower, and particularly preferably 100° C. or higher and 140° C. or higher, from the viewpoint of excellent curability at low temperature. When the baking temperature is within the above range, a coating film having excellent low-temperature drying property and solvent resistance can be obtained.

<Usage>

The coating composition of the present embodiment is not limited to the following, and is suitably used, for example, as a primer, an intermediate coating material, or a top coating material for coating an object to be coated, which is formed by molding various materials, by coating methods such as roll painting, curtain flow painting, spray painting, electrostatic painting, bell painting, or the like. Further, it is also useful as a coating material for imparting cosmetic properties, weather resistance, acid resistance, rust resistance, chipping resistance and the like to pre-coated metals including rust-preventive steel plates, automobiles, plastic coatings and the like. Further, it is also useful as a urethane raw material for adhesives, elastomers, foams, surface treatment agents and the like. Examples of the field of use of the coating composition of the present embodiment include automobiles, building materials or home appliances, woodworking, laminates for solar cells, and the like.

[Object to be Coated]

As the material of the object to be coated by the coating composition, glass; various metals such as aluminum, iron, zinc steel, copper, stainless steel or the like; porous materials such as wood, paper, mortar, stone or the like; members with a fluorine coating, urethane coating, acrylic urethane coating or the like; sealing material-cured products such as silicone-based cured products, modified silicone-based cured products, urethane-based cured products or the like; rubbers such as vinyl chloride, natural rubber, synthetic rubber or the like; leathers such as natural leather, artificial leather or the like; fibers such as plant fiber, animal fiber, carbon fiber, glass fiber or the like; films and plates of resins such as non-woven fabrics, polyesters, acrylics, polycarbonates, triacetyl celluloses, polyolefins or the like; UV-curable acrylic resin layer; layers made of inks such as printing inks, UV inks or the like, and the like can be mentioned.

EXAMPLES

Hereinafter, the present embodiment will be described in more detail based on the Examples and Comparative Examples, but the present embodiment is not limited to the following Examples. In addition, unless otherwise specified, "%" and "part" in the description refer to those based on mass.

The method for measuring the physical properties of the polyisocyanate composition obtained in the Synthesis Examples, and the method for evaluating the films and the film laminates obtained in the Examples and the Comparative Examples are shown below.

<Method for Measuring and Evaluating Physical Properties>

[Physical Property 1] Viscosity

The measurement was performed at 25° C. using an E-type rotational viscometer.

[Physical Property 2] Number-Average Molecular Weight

The number-average molecular weight is a polystyrene-based number-average molecular weight measured by gel permeation chromatography (GPC) using the following apparatus. A polyisocyanate composition was used as a sample. The measurement conditions are shown below.

(Measurement Condition)
Equipment: HLC-802A manufactured by Tosoh Corporation
Column: Manufactured by Tosoh Corporation,
G1000HXL×1
G2000HXL×1
G3000HXL×1
Carrier: Tetrahydrofuran
Detection method: Differential refractometer

[Physical Property 3] Isocyanate Group (NCO) Content

The isocyanate group (NCO) content was determined using the following method. When the polyisocyanate composition contains a blocked polyisocyanate, the blocking agent was dissociated by heating or the like and then used as a measurement sample.

First, 2 g or more and 3 g or less of the polyisocyanate composition were precisely weighed in a flask (Wg). Then, 20 mL of toluene was added to dissolve the polyisocyanate composition after dissociation of the blocking agent. Then, 20 mL of a toluene solution of 2N di-n-butylamine was added, and after mixing, the mixture was allowed to stand at room temperature for 15 minutes. Then 70 mL of isopropyl alcohol was added and mixed. This solution was then titrated into an indicator with a 1N hydrochloric acid solution (Factor F). The obtained titration value was denoted by V2 mL. Then, the same operation was carried out without the polyisocyanate composition, and the obtained titration value was denoted by V1 ml. Next, the isocyanate group (NCO) content X1 (mass %) of the polyisocyanate composition after dissociation of the blocking agent was calculated from the following equation.

Isocyanate group (NCO) content $X1$ (mass %) =

$$(V1 - V2) \times F \times 42 / (W \times 1000) \times 100$$

[Physical Property 4] Total Average Number of Isocyanate Groups

The total average number of isocyanate groups (total average number of NCO) was calculated by the following equation. In the following equation, "Mn" is the number-average molecular weight of the polyisocyanate composition measured after dissociating the blocking agent by heating or the like when the polyisocyanate composition contains a blocked polyisocyanate. The "NCO content" is the content of isocyanate groups present in the total mass of the polyisocyanate composition measured after dissociating the blocking agent by heating or the like when the polyisocyanate composition contains a blocked polyisocyanate, and X1 (mass %) calculated in the above "Physical property 3" was used. In addition, in order to convert the NCO content from a percentage to a decimal, the NCO content was multiplied by "0.01". "42" is the formula weight of isocyanate.

Total average number of $NCO = (Mn \times NCO$ content $(X1) \times 0.01)/42$

[Physical Property 5] Blocking Rate

The blocking rate in the polyisocyanate composition and the film-forming composition was calculated by the following equation.

Blocking rate = molar amount of blocking agent / molar amount of isocyanate group

The "molar amount of isocyanate group" in the above equation is the molar amount of the isocyanate group per mass of the polyisocyanate composition after the blocking agent is dissociated by heat treatment, and was quantified by the following equation using the NCO content calculation in the above "Physical property 3". Here, in order to convert the NCO content from a percentage to a decimal, the NCO content (X1) was multiplied by "0.01". "42" is the formula weight of isocyanate.

Molar amount of isocyanate group = $(X1 \times 0.01)/42$

Further, the "molar amount of blocking agent" in the above equation was quantified by trapping the blocking agent at the time of dissociation of the blocking agent and measuring the molar amount of the blocking agent by gas chromatography-mass spectrometry.

[Physical Property 6] Content of Partially Blocked Polyisocyanate

The content of the partially blocked polyisocyanate was calculated by the following LC-MS measurement as a ratio of peak heights using the formula shown below.

Content of partially blocked polyisocyanate =

$$[(\text{Peak } B + \text{Peak } C)/(\text{Peak } A + \text{Peak } B + \text{Peak } C + \text{Peak } D] \times 100$$

(Preprocessing)
A methanol solution (10 mg/mL) of the polyisocyanate composition was prepared and allowed to stand for 1 day.
(Used Equipment)
  LC: Agilent 1100 series manufactured by Agilent Technologies, Inc.
  MS: LCQ manufactured by Thermo Electron Corporation
  Column: Phenomenex, Kinetex 2.6 µm XB-C18 100A (2.1 mm I.D.×50 mm)
(LC Test Conditions)
  Column temperature: 40° C.
  Detection: 205 nm
  Flow rate: 0.35 mL/min
  Mobile phase: 0.05% formic acid aqueous solution was used for mobile phase A, and methanol was used for mobile phase B Gradient conditions: Mobile phase $A$/Mobile phase $B$ =

50/50 at 0 minutes,

Mobile phase $A$/Mobile phase $B = 0/100$ at 30 minutes,

Mobile phase $A$/Mobile phase $B = 50/50$ at 30.1 minutes,

Mobile phase $A$/, mobile phase $B = 50/50$ at 42 minutes.

Injection volume: 2 µL MS
(MS Condition)
  Ionization: APCI
  Mode: Positive
  Scan range: m/Z=250-2000
(Measurement Results)
In this measurement, unblocked isocyanate groups were detected with the following peaks A to D, with a retention time of 16.4 to 18.4 minutes in the form of addition with methanol.
  Peak A: In the case of unblocked polyisocyanate trimer, methanol was added to three isocyanate groups, and it was detected as peak A with a molecular weight of 600.

Peak B: In the case of monoblocked polyisocyanate trimer, out of three isocyanate groups, methanol was added to two isocyanate groups and a blocking agent was added to one isocyanate group, and it was detected as peak B with a molecular weight of 664, when the blocking agent was 3,5-dimethylpyrazole.

Peak C: In the case of diblocked polyisocyanate trimer, out of three isocyanate groups, methanol was added to one isocyanate group and a blocking agent was added to two isocyanate groups, and it was detected as peak C with a molecular weight of 728 to obtain a peak, when the agent was 3,5-dimethylpyrazole.

Peak D: In the case of fully blocked polyisocyanate (completely blocked polyisocyanate) trimer, the blocking agent was added to three isocyanate groups, and it was detected as peak D with a molecular weight of 792, when the blocking agent was 3,5-dimethylpyrazole.

[Preparation of Primary Cured Film F1]

The film-forming compositions obtained in the Examples and the Comparative Examples were applied to polypropylene (PP) plates with a bar coater so as to have a resin film thickness of 60 μm, and heat-cured at 90° C. for 30 minutes. Then, the obtained films were peeled off from the PP plates to obtain primary cured films F1.

[Preparation of Primary Cured Film F1']

The film-forming compositions obtained in the Examples and the Comparative Examples were applied to polypropylene (PP) plates with a bar coater so as to have a resin film thickness of 60 μm, and heat-cured at 140° C. for 30 minutes. Then, the obtained films were peeled off from the PP plates to obtain primary cured film F1's.

[Evaluation 1] Stretchability (1) Measurement of Glass Transition Temperature of Film Each film-forming composition obtained in the Examples and the Comparative Examples was applied to a stainless steel plate with a bar coater so that the resin film thickness was 25 μm, and heat-cured at 90° C. for 30 minutes to obtain a test piece for measuring the glass transition temperature. The logarithmic decrement of the obtained test piece was measured using a rigid-body pendulum type viscoelasticity measuring instrument (RPT-3000W, manufactured by A&D Company, Limited). The peak top of the temperature-logarithmic decrement curve was taken as the glass transition temperature of the film. Based on the glass transition temperature obtained by the measurement, the measurement temperatures of breaking elongation and breaking stress were determined.

(2) Measurement of Breaking Elongation and Breaking Stress

Tensile tests of each film prepared using the film-forming compositions obtained in the Examples and the Comparative Examples were carried out using a universal testing machine (manufactured by A&D Company, Limited, RTE-1210) under the conditions shown below. Based on the breaking elongation and breaking strength obtained by the measurement, the breaking elongation and breaking stress of the film were evaluated according to the following evaluation criteria.

(Measurement Condition)
Dimension of test piece: width 10× length 20 mm
Thickness of test piece: approximately 60 μm
Tensile rate: 20 mm/min
Measurement temperature: Measured glass transition temperature+10° C.

(Evaluation Criteria for Breaking Elongation)
☆: The breaking elongation of the film at the measured temperature was 200% or more.
◎: The breaking elongation of the film at the measured temperature was 180% or more and 199% or less.
○: The breaking elongation of the film at the measurement temperature was 150% or more and 179% or less.
Δ: The breaking elongation of the film at the measurement temperature was 50% or more and 149% or less.
x: The breaking elongation of the film at the measurement temperature was less than 50%.

(Evaluation Criteria for Breaking Stress)
☆: The breaking stress of the film at the measured temperature was 1.30 MPa or more.
◎: The breaking stress of the film at the measurement temperature was 1.10 MPa or more and 1.29 MPa or less.
○: The breaking stress of the film at the measurement temperature was 0.80 MPa or more and 1.09 MPa or less.
Δ: The breaking stress of the film at the measurement temperature was 0.50 MPa or more and 0.79 MPa or less.
x: The breaking stress of the film at the measurement temperature was less than 0.50 MPa

[Evaluation 2] Blocking Resistance

The presence or absence of tackiness on each film prepared using the film-forming compositions obtained in the Examples and the Comparative Examples was confirmed by touch. The blocking resistance was evaluated according to the evaluation criteria shown below. In addition, "tackiness" here means a property unique to adhesiveness called instant adhesive force, and specifically, it can be said that it is a resistance force when an object to be adhered is sandwiched between fingers and then immediately separated.

(Evaluation Criteria)
○: Tackiness was not confirmed.
ΔA: Slight tackiness was confirmed, but there was no problem in practical use.
x: Apparent tackiness was confirmed.

[Preparation of Secondary Cured Film]

(Secondary Cured Film F2 Using Primary Cured Film F1)

The film-forming compositions obtained in the Examples and the Comparative Examples were applied to glass plates with a bar coater so as to have a resin film thickness of 60 μm, and heat-cured at 90° C. for 30 minutes to obtain primary cured films F1.

The obtained primary cured films F1 were further heat-cured at 140° C. for 30 minutes to obtain secondary cured films F2.

(Secondary Cured Film F2' Using Primary Cured Film F1')

The film-forming compositions obtained in the Examples and the Comparative Examples were applied to glass plates with a bar coater so as to have a resin film thickness of 60 μm, and heat-cured at 140° C. for 30 minutes to obtain primary cured films F1'.

The secondary cured films F2' were obtained by irradiating the obtained primary cured films F1' with ultraviolet rays having an integrated light intensity of 900 mJ/cm$^2$ for 5 minutes.

[Evaluation 3] Solvent Resistance of Film Laminate 0.1 mL of xylene was added dropwise to the film surface of each film laminate prepared using the film-forming compositions obtained in the Examples and the Comparative Examples. After allowing to stand for 15 minutes, the state of the film was visually observed to evaluate the solvent resistance. The evaluation criteria were as follows.

(Evaluation Criteria)
◯: No roughness or marks were observed on the surface.
△: Slight marks were observed on the surface, but there was no problem in practical use.
X: Apparent roughness and marks were observed on the surface.

[Preparation of Adhesive Resin-Cured Product (Laminated Polyester Plate)]

As the polyester plate, a polyethylene terephthalate plate manufactured by Takiron Co., Ltd. (trade name: Super PET plate PET-6010, film thickness: 4 mm) was used.

A coating liquid containing the adhesive resin compositions obtained in the Examples and the Comparative Examples and having a resin solid content adjusted to 30% by mass was applied to the surface of the polyethylene terephthalate plate with an applicator and dried at 90° C. for 30 seconds. Then, a heat treatment was carried out at 150° C. for 1 minute, and then the mixture was cooled to obtain an easy-adhesion-treated polyester plate having an easy-adhesion-treated layer having a film thickness of 1 μm.

Further, a UV-curable acrylic resin composition having the following composition was applied to the easy-adhesion-treated layer surface with an applicator, and was irradiated from the plate surface side with an ultraviolet lamp for 5 minutes to irradiate ultraviolet rays having an integrated light amount of 900 mJ/cm$^2$. After irradiation, heat treatment was carried out at 150° C. for 10 minutes to obtain a laminated polyester plate having a UV-curable acrylic resin layer having a thickness of 20 μm.

(Composition of UV-Curable Acrylic Resin Composition)
- 2,2-Bis (4-(acryloxydiethoxy) phenyl) propane (manufactured by Shin-Nakamura Chemical Co., Ltd., trade name: NK ester A-BPE-4): 50% by mass with respect to the total mass of the UV-curable acrylic resin composition
- Tetrahydrofurfuryl acrylate (manufactured by Osaka Organic Chemical Industry Co., Ltd., trade name Viscoat #150): 40% by mass with respect to the total mass of the UV-curable acrylic resin composition
- (Trade name: Irgacure 184, manufactured by Ciba Specialty Chemicals): 10% by mass with respect to the total mass of the UV-curable acrylic resin composition

[Evaluation 4] Solvent Resistance Before Lamination

As the polyester plate, a polyethylene terephthalate plate manufactured by Takiron Co., Ltd. (trade name: Super PET plate PET-6010, film thickness: 4 mm) was used.

A coating liquid containing the adhesive resin compositions obtained in the Examples and the Comparative Examples and having a resin solid content adjusted to 30% by mass was applied to the surface of the polyethylene terephthalate plate with an applicator and dried at 90° C. for 30 seconds. Then, a heat treatment was carried out at 150° C. for 1 minute, and then the mixture was cooled to obtain an easy-adhesion-treated polyester plate having an easy-adhesion-treated layer having a film thickness of 1 μm.

Toluene was placed in a silicon ring having a diameter of 1 cm on the obtained easily adhesive-treated polyester plate, a watch glass was placed on the silicon ring, and the mixture was allowed to stand at 23° C. for 2 hours. After that, toluene was wiped off with a Kimwipe, and the state of the coating film was confirmed. The solvent resistance before lamination was evaluated according to the following evaluation criteria.

(Evaluation Criteria)
5: There was almost no change.
4: A faint mark was observed on the 1 cm-ring.
3: A clear mark was observed on the 1 cm-ring.
2: Partial deterioration was observed inside the 1 cm-ring.
1: The inside of the 1 cm-ring was deteriorated overall.

[Evaluation 5] Adhesion to Upper Layer

On the surface of the UV-cured acrylic resin layer of the resulting laminated polyester plate, a cutter guide with a gap interval of 2 mm was used to make 100 grid-shaped cuts that penetrate only the UV-cured acrylic resin layer. Then, a cellophane adhesive tape (manufactured by Nichiban Co., Ltd., No. 405: 24 mm width) was attached to the surface of the grid-shaped cuts, and rubbed with an eraser to completely adhere to the cut surface. After that, the cellophane adhesive tape was rapidly peeled off from surface of the UV-curable acrylic resin layer of the laminated polyester plate at a peeling angle of 180°, and then the peeled surface was observed and the peeled squares were counted. Adhesion to the upper layer was evaluated according to the following evaluation criteria.

(Evaluation Criteria)
5: The number of peeled grids was 0.
4: Only some edges of grids were peeled off.
3: The number of peeled grids was 1 or more and 10 or less
2: The number of peeled grids was 11 or more and 20 or less
1: The number of peeled grids was 21 or more.

[Evaluation 6] Stability Under High Temperature and High Humidity

The resulting laminated polyester plate was left in a high-temperature and high-humidity bath at 80° C. and 95% RH for 48 hours. Then, the laminated polyester plate was taken out and left at room temperature for 10 hours. After that, the adhesion was evaluated by the same method as in the initial adhesion evaluation. The evaluation criteria were as follows.

(Evaluation Criteria)
5: The number of peeled grids was 0 (including the case where only the edge was peeled off).
4: The number of peeled grids was 1 or more and 15 or less.
3: The number of peeled grids was 16 or more and 30 or less.
2: The number of peeled grids was 31 or more and 50 or less
1: The number of peeled grids was 51 or more

[Evaluation of Coating Film]
[Evaluation 7] Low-Temperature Drying Property

The coating compositions obtained in the Examples and the Comparative Examples were applied to a polypropylene plate, baked at 120° C. for 30 minutes, and then the coating film was cut out and left in acetone for 24 hours in an environment of 23° C. The coating film after immersion was dried, and the percentage of the remaining coating film was calculated from the weight before immersion in acetone to evaluate the residual rate. The evaluation criteria were as follows.

(Evaluation Criteria)
⊚: The residual rate was 90% or more.
◯: The residual rate was 80% or more and less than 90%.
x: The residual rate was less than 80%.

[Evaluation 8] Solvent Resistance of Coating Film

The coating compositions obtained in the Examples and the Comparative Examples were applied to glass plates, baked at 120° C. for 30 minutes, and then allowed to stand in an environment of 23° C. and 50% humidity for 24 hours. A rubbing test was carried out on the coating film by reciprocating cotton soaked in acetone for 20 times, and the appearance of the coating film was visually observed and evaluated. The evaluation criteria were as follows.
(Evaluation Criteria)
⊚: There was almost no change on the coating film.
○: Some marks were observed on the coating film.
x: Elution marks were observed on the coating film.
[Evaluation 9] Pot Life of Coating Material After preparing each coating composition obtained in the Examples and the Comparative Examples, the compositions were stored at 23° C. for 7 hours, and then the viscosity increase rate at 25° C. was evaluated when the initial viscosity was set to 100%. The evaluation criteria were as follows.
(Evaluation Criteria)
⊚: The viscosity increase rate was 100% or more and less than 150%.
○: The viscosity increase rate was 150% or more and less than 180%.
Δ: The viscosity increase rate was 180% or more and less than 200%.
x: The viscosity increase rate was 200% or more.
<Synthesis of Polyisocyanate>

Synthesis Example 1

(Synthesis of Polyisocyanate p-1)

The inside of a four-necked flask equipped with a stirrer, a thermometer, a reflux condenser, a nitrogen blowing tube, and a dropping funnel was made into a nitrogen atmosphere, and 600 parts of HDI and 30 parts of a polyester polyol derived from trihydric alcohol and ε-caprolactone (manufactured by Daicel Corporation, trade name: "PLACCEL 303") were charged, and a urethanization reaction was carried out by keeping the temperature inside the reactor at 90° C. for 1 hour while stirring. After that, the temperature inside the reactor was maintained at 60° C., and an isocyanurate-forming catalyst of tetramethylammonium capriate was added, and when a predetermined yield was reached, phosphoric acid was added to stop the reaction. After filtering the reaction solution, the unreacted HDI was removed using a thin film evaporator. The formation of polyisocyanate was confirmed by measuring the number-average molecular weight of the reaction product with GPC and measuring the isocyanate content by titration. The obtained Polyisocyanate p-1 had a viscosity at 25° C. of 9,500 mPa·s, an isocyanate content of 19.2%, a number-average molecular weight of 1,100, and an average number of isocyanate groups of 5.3.

Synthesis Example 2

(Synthesis of Polyisocyanate p-2)

The inside of a four-necked flask equipped with a stirrer, thermometer, reflux condenser, nitrogen blowing tube, and a dropping funnel was made into a nitrogen atmosphere, and 600 parts of HDI was charged, then the temperature inside the reactor was maintained at 60° C., and then an isocyanurate-forming catalyst of tetramethylammonium capriate was added, and when the isocyanate content of the reaction solution reached 38.7% by mass, phosphoric acid was added to stop the reaction. After filtering the reaction solution, the unreacted HDI was removed using a thin film evaporator. The formation of polyisocyanate was confirmed by measuring the number-average molecular weight of the reaction product with GPC and measuring the isocyanate content by titration. The obtained Polyisocyanate p-2 had a viscosity at 25° C. of 2,700 mPa·s, an isocyanate content of 21.7%, a number-average molecular weight of 660, and an average number of isocyanate groups of 3.4.

Synthesis Example 3

(Synthesis of Polyisocyanate p-3)

The inside of a four-necked flask equipped with a stirrer, a thermometer, a reflux condenser, a nitrogen blowing tube, and a dropping funnel was made into a nitrogen atmosphere, and 700 parts of HDI, 300 parts of IPDI, and 30 parts of a polycaprolactone polyol-based polyester polyol "Plaxel 303" (trade name of Daicel Corporation, molecular weight: 300), which is a trihydric alcohol, was charged, then the temperature inside the reactor was maintained at 90° C. for 1 hour while stirring to carry out the urethanization reaction. After that, the temperature inside the reactor was maintained at 80° C., and an isocyanurate-forming catalyst of tetramethylammonium capriate was added, and when the isocyanate content of the reaction solution reached 36.2% by mass, phosphoric acid was added to stop the reaction. After filtering the reaction solution, the unreacted HDI was removed using a thin film evaporator. The formation of polyisocyanate was confirmed by measuring the number-average molecular weight of the reaction product with GPC and measuring the isocyanate content by titration. The obtained Polyisocyanate p-3 had a viscosity at 25° C. of 180,000 mPa·s, an isocyanate content of 18.7%, a number-average molecular weight of 1200, and an average number of isocyanate groups of 5.3.

Synthesis Example 4

(Synthesis of Polyisocyanate p-4)

The inside of a four-necked flask equipped with a stirrer, a thermometer, a reflux condenser, a nitrogen blowing tube, and a dropping funnel was made into a nitrogen atmosphere, and 1,000 parts of HDI and 340 parts of a polyester polyol derived from trihydric alcohol and ε-caprolactone (manufactured by Daicel Corporation, trade name: "PLACCEL 308") were charged, and a urethanization reaction was carried out by keeping the temperature inside the reactor at 95° C. for 1.5 hour while stirring. After filtering the reaction solution, the unreacted HDI was removed using a thin film evaporator. The formation of polyisocyanate was confirmed by measuring the number-average molecular weight of the reaction product with GPC and measuring the isocyanate content by titration. The obtained Polyisocyanate p-4 had a viscosity at 25° C. of 4,000 mPa·s, an isocyanate content of 9.1%, a number-average molecular weight of 1,500, and an average number of isocyanate groups of 3.2.

TABLE 1-1

|  | Synthesis Example 1 | Synthesis Example 2 | Synthesis Example 3 | Synthesis Example 4 |
|---|---|---|---|---|
| Polyisocyanate | p-1 | p-2 | p-3 | p-4 |
| Total average number of NCO | 5.3 | 3.4 | 5.3 | 3.2 |
| Number-average molecular weight | 1100 | 660 | 1200 | 1500 |

<(1-1) Preparation of Polyisocyanate Composition>

Example 1-1-5

(Preparation of Polyisocyanate Composition PI-a1-1)

The inside of a four-necked flask equipped with a stirrer, a thermometer, a reflux cooling tube, a nitrogen blowing tube, and a dropping funnel was made into a nitrogen atmosphere, and 500 of Polyisocyanate p-1 obtained in Synthesis Example 1 and 200 g of butyl acetate were charged, then heated to 60° C. while stirring, and 3,5-dimethylpyrazole (hereinafter, may be abbreviated as "3,5-

Examples 1-1-1, 1-1-2, 1-1-4, 1-1-6 to Jan. 1, 2011

(Polyisocyanate Compositions PI-a1-1, PI-a1-2, PI-a1-4, PI-a1-6 to PI-a1-11)

Polyisocyanate Compositions PI-a1-1, PI-a1-2, PI-a1-4, PI-a1-6 to PI-a1-11 were obtained in the same manner as in Examples 1-1-5, except that the types of the polyisocyanates and the blocking agents, the blocking rate, and the content (mol %) of the partially blocked polyisocyanates were as shown in Table 1-2. In Table 1-2, "3,5-DMP" is 3,5-dimethylpyrazole, "MEK-Ox" is methylethylketooxime, "ε-CL" is ε-caprolactam, and "DEM" is diethyl malonate (hereinafter, the same applies).

TABLE 1-2

|  | Ex. 1-1-1 | Ex. 1-1-2 | Ex. 1-1-3 | Ex. 1-1-4 | Ex. 1-1-5 | Ex. 1-1-6 | Ex. 1-1-7 |
|---|---|---|---|---|---|---|---|
| Polyisocyanate Composition | PI-a1-1 | PI-a1-2 | PI-a1-3 | PI-a1-4 | PI-a1-5 | PI-a1-6 | PI-a1-7 |
| Polyisocyanate | p-1 | p-1 | p-1 | p-1 | p-1 | p-1 | p-1 |
| Blocking agent | 3,5-DMP | 3,5-DMP | 3,5-DMP | 3,5-DMP | 3,5-DMP | 3,5-DMP | 3,5-DMP |
| Blocking rate[mol %] | 10 | 30 | 50 | 50 | 75 | 80 | 90 |
| Partially blocked polyisocyanate [mol %] | 40 | 85 | 0 | 90 | 80 | 70 | 40 |

|  | Ex. 1-1-8 | Ex. 1-1-9 | Ex. 1-1-10 | Ex. 1-1-11 | Com. Ex. 1-3-1 | Com. Ex. 1-3-2 |
|---|---|---|---|---|---|---|
| Polyisocyanate Composition | PI-a1-8 | PI-a1-9 | PI-a1-10 | PI-a1-11 | PI-b1-1 | PI-b1-2 |
| Polyisocyanate | p-1 | p-1 | p-1 | p-2 | p-1 | p-1 |
| Blocking agent | MEK-Ox | ε-CL | DEM | 3,5-DMP | — | 3,5-DMP |
| Blocking rate[mol %] | 75 | 75 | 75 | 75 | 0 | 100 |
| Partially blocked polyisocyanate [mol %] | 80 | 80 | 80 | 60 | 0 | 0 |

DMP") as a blocking agent was gradually added in a molar amount of 0.75 times the molar amount of the isocyanate group in Polyisocyanate p-1. After adding all of them, the mixture was further stirred for 1 hour to obtain Polyisocyanate Composition PI-a1-1.

Comparative Example 1-3-1

(Preparation of Polyisocyanate Composition PI-b1-1)

Polyisocyanate p-1 synthesized in Synthesis Example 1 was diluted with butyl acetate so that the solid content was 75% by mass with respect to the total mass of the composition to obtain Polyisocyanate Composition PI-b1-1.

Comparative Example 1-3-2

(Preparation of Polyisocyanate Composition PI-b1-2)

Polyisocyanate Composition PI-b1-2 was obtained in the same manner as in Example 1 except that the amount of 3,5-dimethylpyrazole added was 1.05 times the molar amount of the isocyanate group of the polyisocyanate.

Example 1-1-3

(Preparation of Polyisocyanate Composition PI-a1-3)

Polyisocyanate Composition PI-b1-1 obtained in Comparative Example 1-3-1 and Polyisocyanate Composition PI-b1-2 obtained in Comparative Example 1-3-2 were mixed with an isocyanate group molar ratio of 1:1 (including the blocked isocyanate groups) to obtain Polyisocyanate Composition PI-a1-3.

<(1-2) Preparation of Film-Forming Composition>

(Preparation of Active Hydrogen-Containing Compounds AH-1-1 to AH-1-5)

An ethyl acetate solution of acrylic polyol resin (AP), polycaprolactone diol resin (PCL-1, PCL-2), and polycarbonate diol resin (PCD) was prepared. Table 1-3 shows the hydroxy group concentration of these resins (resin standard), the solid content, and the solvent used.

The above resins were mixed with the ratios shown in Table 1-4 to obtain active hydrogen-containing compounds AH-1-1 to AH-1-5.

TABLE 1-3

|  | AP | PCL-1 | PCL-2 | PCD |
|---|---|---|---|---|
| Resin | Acrylic polyol | Polycaprolactone diol | Polycaprolactone diol | Polycarbonate diol |
| Solid content concentration [wt %] | 41 | 100 | 100 | 100 |
| Solvent | Ethyl acetate | — | — | — |
| Concentration of active hydrogen [wt %] | 1.12 | 6.42 | 0.85 | 6.8 |

TABLE 1-4

| Active hydrogen-containing compound |  | AH-1-1 | AH-1-2 | AH-1-3 | AH-1-4 | AH-1-5 |
|---|---|---|---|---|---|---|
| Composition [part by | AP | 100 | 100 | 100 | 100 | 100 |
|  | PCL-1 | 0 | 5.3 | 14.7 | 0 | 0 |

TABLE 1-4-continued

| Active hydrogen-containing compound | | AH-1-1 | AH-1-2 | AH-1-3 | AH-1-4 | AH-1-5 |
|---|---|---|---|---|---|---|
| weight] | PCL-2 | 0 | 0 | 0 | 18.1 | 0 |
| | PCD | 0 | 0 | 0 | 0 | 9.8 |

Example 1-2-1

(Preparation of Film-Forming Composition F-a1)

The active hydrogen-containing compound AH-1-1 was blended with Polyisocyanate Composition PI-a1-3 obtained in Example 1-1-3 so that NCO/OH=1.0, and diluted with propylene glycol-1-monomethyl ether-2-acetylate (PMA) so that the solid content was 25% by mass. At that time, dibutyl tin dilaurate was added so as to have a concentration of 0.1% with respect to the resin to obtain Film-Forming Composition F-a1.

Examples 1-2-2 to Jan. 2, 2015

(Preparation of Film-Forming Compositions F-a2 to F-a15)

Film-Forming Compositions F-a2 to F-a15 were obtained in the same manner as in Example 1-2-1 except that the active hydrogen-containing compound and the polyisocyanate composition were as shown in Table 1-5.

Comparative Example 1-4-1

(Preparation of Film-Forming Composition F-b1)

The film-forming composition was obtained in the same manner as in Example 1-2-2 except that Polyisocyanate Composition PI-b1-1 obtained in Comparative Example 1-3-1 was used as the polyisocyanate composition.

Comparative Example 1-4-2

(Preparation of Film-Forming Composition F-b2)

Film-Forming Composition F-b2 was obtained in the same manner as in Example 1-2-2 except that Polyisocyanate Composition PI-b1-2 obtained in Comparative Example 1-3-2 was used as the polyisocyanate composition.

<(1-3) Preparation of Primary Cured Film F1 and Secondary Cured Film F2>

Primary cured films F1 and secondary cured films F2 were prepared by the method for producing a primary cured film F1 and the method for producing a film laminate using the primary cured film F1 using the film-forming compositions prepared in the Examples and the Comparative Examples, and the resulting films were evaluated. The evaluation results are shown in Table 1-5 below. However, the film using Film-Forming Composition F-b2 produced in Comparative Example 1-4-2 was brittle, and it was not possible to cut a test piece for measuring the breaking elongation and the breaking stress. For this reason, in Table 1-5, it is described as "not measurable".

TABLE 1-5

| | | Ex. 1-2-1 | Ex. 1-2-2 | Ex. 1-2-3 | Ex. 1-2-4 | Ex. 1-2-5 | Ex. 1-2-6 | Ex. 1-2-7 | Ex. 1-2-8 | Ex. 1-2-9 | Ex. 1-2-10 |
|---|---|---|---|---|---|---|---|---|---|---|---|
| Film-forming composition | | F-a1 | F-a2 | F-a3 | F-a4 | F-a5 | F-a6 | F-a7 | F-a8 | F-a9 | F-a10 |
| Film-forming composition | Polyisocyanate | PI-a1-3 | PI-a1-5 | PI-a1-1 | PI-a1-2 | PI-a1-4 | PI-a1-5 | PI-a1-6 | PI-a1-7 | PI-a1-8 | PI-a1-9 |
| | Active hydrogen-containing compound | AH-1-1 | AH-1-1 | AH-1-2 | AH-1-2 | AH-1-2 | AH-1-2 | AH-1-2 | AH-1-2 | AH-1-2 | AH-1-2 |
| | NCO/OH | 1 | 1 | 1 | 1 | 1 | 1 | 1 | 1 | 1 | 1 |
| Primary cured film F1 | Molar amount γ of functional group X | 0.28 | 0.14 | 0.74 | 0.57 | 0.40 | 0.20 | 0.16 | 0.08 | 0.20 | 0.19 |
| | Molar amount β of isocyanate group blocked with blocking agent | 0.28 | 0.41 | 0.08 | 0.24 | 0.40 | 0.59 | 0.62 | 0.69 | 0.59 | 0.58 |
| | γ/β | 1.00 | 0.33 | 9.00 | 2.33 | 1.00 | 0.33 | 0.25 | 0.11 | 0.33 | 0.33 |
| | Molar amount α' of active hydrogen group | 0.28 | 0.41 | 0.08 | 0.24 | 0.40 | 0.59 | 0.62 | 0.69 | 0.59 | 0.58 |
| Second cured film F2 | Molar amount γ of functional group X | 0.56 | 0.55 | 0.82 | 0.81 | 0.79 | 0.78 | 0.78 | 0.77 | 0.78 | 0.77 |
| | γ/γ' | 0.50 | 0.25 | 0.90 | 0.70 | 0.50 | 0.25 | 0.20 | 0.10 | 0.25 | 0.25 |
| Evaluation of primary cured film F1 | Breaking elongation | Δ | ◎ | Δ | ○ | ◎ | ☆ | ☆ | ☆ | ☆ | ☆ |
| | Breaking stress | ○ | ◎ | Δ | ○ | ◎ | ☆ | ◎ | Δ | ☆ | ☆ |
| | Blocking resistance | ○ | ○ | ○ | ○ | ○ | ○ | ○ | Δ | ○ | ○ |
| Evaluation of secondary cured film F2 | Solvent resistance | ○ | ○ | ○ | ○ | ○ | ○ | ○ | ○ | ○ | Δ |

| | | Ex. 1-2-11 | Ex. 1-2-12 | Ex. 1-2-13 | Ex. 1-2-14 | Ex. 1-2-15 | Com. Ex. 1-4-1 | Com. Ex. 1-4-2 |
|---|---|---|---|---|---|---|---|---|
| Film-forming composition | | F-a11 | F-a12 | F-a13 | F-a14 | F-a15 | F-b1 | F-b2 |
| Film-forming composition | Polyisocyanate | PI-a1-10 | PI-a1-11 | PI-a1-5 | PI-a1-5 | PI-a1-5 | PI-b1-1 | PI-b1-2 |
| | Active hydrogen-containing compound | AH-1-2 | AH-1-2 | AH-1-3 | AH-1-4 | AH-1-5 | AH-1-1 | AH-1-1 |
| | NCO/OH | 1 | 1 | 1 | 1 | 1 | 1 | 1 |
| Primary cured film F1 | Molar amount γ of functional group X | 0.19 | 0.20 | 0.25 | 0.13 | 0.23 | 0.57 | 0.00 |
| | Molar amount β of isocyanate group blocked with | 0.56 | 0.60 | 0.76 | 0.38 | 0.70 | 0.00 | 0.54 |

TABLE 1-5-continued

|  |  |  |  |  |  |  |  |  |
|---|---|---|---|---|---|---|---|---|
|  | blocking agent |  |  |  |  |  |  |  |
|  | γ/β | 0.33 | 0.33 | 0.33 | 0.33 | 0.33 | — | 0.00 |
|  | Molar amount α of active hydrogen group | 0.56 | 0.60 | 0.76 | 0.38 | 0.70 | 0.00 | 0.54 |
| Second cured film F2 | Molar amount γ' of functional group X | 0.75 | 0.80 | 1.02 | 0.51 | 0.93 | 0.57 | 0.54 |
|  | γ/γ' | 0.25 | 0.25 | 0.25 | 0.25 | 0.25 | 1.00 | 0.00 |
| Evaluation of primary cured film F1 | Breaking elongation | ☆ | ☆ | ☆ | ☆ | ☆ | X | Not measurable |
|  | Breaking stress | ☆ | ☆ | ◯ | ☆ | ◎ | ◯ | Not measurable |
|  | Blocking resistance | ◯ | ◯ | ◯ | ◯ | ◯ | ◯ | Δ |
| Evaluation of secondary cured film F2 | Solvent resistance | ◯ | ◯ | ◯ | ◯ | ◯ | ◯ | ◯ |

As shown in Table 1-5, the films using Film-Forming Compositions F-a1 to F-a15 of Examples 1-2-1 to Jan. 2, 2015 showed good blocking resistance while maintaining good stretchability. In addition, the film laminates in which the films were laminated on the glass plates had excellent solvent resistance.

The films obtained by using Film-Forming Compositions F-a2 and F-a5 to F-a15 containing the polyisocyanate composition having a relatively high blocking rate tended to have particularly good breaking elongation.

Further, the films obtained by using Film-Forming Compositions F-a2, F-a5 to F-a7 and F-a9 to F-a15 containing a polyisocyanate composition having a blocking rate of 50 to 80 mol % and having a molar amount γ of functional group X of the primary cured film of 0.1 or more and 0.4 or less tended to be particularly good in both breaking elongation and breaking stress.

On the other hand, the films and film laminates obtained by using Film-Forming Compositions F-b1 to F-b2 of Comparative Examples 1-4-1 and 1-4-2 did not show good stretchability and excellent blocking resistance solvent resistance simultaneously.

<(1-4) Preparation of Film-Forming Composition and Primary Cured Film F1'>

Examples 1'-2-1 to 1'-2-2

(Preparation of Film-Forming Composition F'-a1)

Polyester acrylate PEA-1 containing a hydroxy group (hydroxy concentration: 1.21% by mass, acryloyl group concentration: 11.0% by mass) was blended with Polyisocyanate Composition PI-b1-1 so that NCO/OH=1.0. Subsequently, a photoinitiator Omnirad 651 (manufactured by IGM resin) was added so as to be 5% by mass with respect to PEA-1. Further, it was diluted with propylene glycol-1-monomethyl ether-2-acetylate (PMA) to a solid content of 25% by mass. At that time, dibutyl tin dilaurate was added so as to have a resin concentration of 0.1% to obtain Film-Forming Composition F'-a1.

(Preparation of Film-Forming Composition F-a2)

Film-Forming Composition F'-a2 was obtained in the same manner as in the preparation of F'-a1 except that the polyester acrylate containing hydroxy group was replaced with PEA-2 (hydroxy concentration: 2.12% by mass, acryloyl group concentration: 20.6% by mass).

In accordance with the method for producing a primary cured film F1' and the method for producing a film laminate using the primary cured film F1', primary cured films F1' and secondary cured films F2' were prepared using the film-forming compositions prepared in the Examples and the Comparative Examples, and the films were evaluated. The evaluation results are shown in Table 1-6.

TABLE 1-6

|  |  | Ex. 1'-2-1 | Ex. 1'-2-2 |
|---|---|---|---|
| Composition | Film-forming composition | F'-a1 | F'-a2 |
|  | Polyisocyanate composition | PI-b1-3 | PI-b1-3 |
|  | Hydroxyl group-containing polyester acrylate | PEA-1 | PEA-2 |
|  | NCO/OH | 1 | 1 |
| Primary cured film F1' | Molar amount γ of functional | 0.59 | 0.95 |
|  | Molar amount δ of acryloyl group | 1.67 | 1.79 |
|  | γ/δ | 0.35 | 0.53 |
| Secondary cured film F2' | γ' | 2.26 | 2.74 |
|  | (γ' = γ + δ) |  |  |
|  | γ/γ' | 0.26 | 0.35 |
| Evaluation of primary cured film F1' | Breaking elongation | ◯ | Δ |
|  | Breaking stress | ◯ | Δ |
|  | Blocking resistance | ◯ | ◯ |
| Evaluation of secondary cured film F2' | Solvent resistance | ◯ | ◯ |

As shown in Table 1-6, the films using Film-Forming Compositions F-b1 to F-b4 of Examples 1-3-1 to 1-3-2 showed good blocking resistance while maintaining good stretchability. Further, the film laminates in which the films were laminated on the glass plates had excellent solvent resistance.

<(2-1) Preparation of Polyisocyanate Composition>

Example 2-1-1

(Preparation of Polyisocyanate Composition PI-a2-1)

The inside of a four-necked flask equipped with a stirrer, a thermometer, a reflux cooling tube, a nitrogen blowing tube, and a dropping funnel was made into a nitrogen atmosphere, and 500 g of Polyisocyanate p-1 obtained in Synthesis Example 1 and 200 g of butyl acetate were charged, then heated to 60° C. while stirring, and 3,5-dimethylpyrazole (hereinafter, may be abbreviated as "3,5-DMP") as a blocking agent was gradually added in a molar amount of 0.75 times the molar amount of the isocyanate group in Polyisocyanate p-1. After adding all of them, the mixture was further stirred for 1 hour to obtain Polyisocyanate Composition PI-a2-1.

Comparative Example 2-3-1

(Preparation of Polyisocyanate Composition PI-b2-1)

Polyisocyanate p-1 synthesized in Synthesis Example 1 was diluted with butyl acetate so that the solid content was 75% by mass with respect to the total mass of the composition to obtain Polyisocyanate Composition PI-b2-1.

Comparative Example 2-3-2

(Preparation of Polyisocyanate Composition PI-b2-2)
Polyisocyanate Composition PI-b2-2 was obtained in the same manner as in Example 1 except that the amount of 3,5-dimethylpyrazole added was 1.05 times the molar amount of the isocyanate group of the polyisocyanate.

Comparative Example 2-3-3

(Preparation of Polyisocyanate Composition PI-b2-3)
Polyisocyanate Composition PI-b2-3 was obtained in the same manner as in Example 1 except that a mixture of MEK-Ox and 3,5-DMP (MEK-Ox/3,5-DMP=1/1 (molar ratio)) was used instead of 3,5-dimethylpyrazole, and the molar amount thereof was 1.05 times the molar amount of the isocyanate group of the polyisocyanate.

Example 2-1-2

(Preparation of Polyisocyanate Composition PI-a2-2)
Polyisocyanate Composition PI-b2-1 obtained in Comparative Example 2-3-1 and Polyisocyanate Composition PI-b2-2 obtained in Comparative Example 2-3-2 were mixed with an isocyanate group molar ratio of 1:1 (including the blocked isocyanate groups) to obtain Polyisocyanate Composition PI-a2-2.

Examples 2-1-3 to 2-1-11

(Preparation of Polyisocyanate Compositions PI-a2-3 to PI-a2-11)
Polyisocyanate Compositions PI-a2-3 to PI-a2-11 were obtained in the same manner as in Example 1 except that the types of the polyisocyanates and blocking agents, the blocking rate and the content (mol %) of the partially blocked polyisocyanates were as shown in Table 2-1. In Table 2-1, "MEK-Ox" is methylethylketooxime, and "ε-CL" is ε-caprolactam (hereinafter, the same applies).

<(2-2) Preparation of Adhesive Resin Composition>

Example 2-2-1

(Preparation of Adhesive Resin Composition S-a1)
An ethyl acetate solution of acrylic polyol resin (hydroxy concentration: 4.5% by mass (resin standard), resin solid content: 41% by mass, hereinafter, the resin solution is referred to as "AH-3") was blended with Polyisocyanate Composition PI-a2-1 obtained in Example 2-1-1 so that NCO/OH=1.0, and then diluted with propylene glycol-1-monomethyl ether-2-acetylate (PMA) so that the solid content was 30% by mass to obtain an Adhesive Resin Composition S-a1.

Examples 2-2-2 to Feb. 2, 2011 and Comparative Examples 2-4-1 to 2-4-3

(Adhesive Resin Compositions S-a2 to S-a11 and S-b1 to S-b3)
Adhesive Resin Compositions S-a2 to S-a11 and S-b1 to S-b3 were obtained in the same manner as in Example 2-2-1 except that the polyisocyanate compositions shown in Table 2-2 were used.

In accordance with the above-described methods, the adhesive resin compositions prepared in the Examples and the Comparative Examples were evaluated. The results are shown in Table 2-2 below.

TABLE 2-1

|  | Ex. 2-1-1 | Ex. 2-1-2 | Ex. 2-1-3 | Ex. 2-1-4 | Ex. 2-1-5 | Ex. 2-1-6 | Ex. 2-1-7 | Ex. 2-1-8 |
|---|---|---|---|---|---|---|---|---|
| Polyisocyanate composition | PI-a2-1 | PI-a2-2 | PI-a2-3 | PI-a2-4 | PI-a2-5 | PI-a2-6 | PI-a2-7 | PI-a2-8 |
| Polyisocyanate | p-1 | p-1 | p-1 | p1 | p-1 | p-1 | p-1 | p-2 |
| Total average number of NCO | 5.3 | 5.3 | 5.3 | 5.3 | 5.3 | 5.3 | 5.3 | 3.4 |
| Blocking agent | 3,5-DMP | 3,5-DMP | 3,5-DMP | 3,5-DMP | 3,5-DMP | 3,5-DMP | MEK-Ox | 3,5-DMP |
| Blocking rate (mol %) | 75 | 50 | 15 | 25 | 50 | 85 | 50 | 50 |
| Partially blocked isocyanate (mol %) | 80 | 0 | 50 | 80 | 90 | 50 | 90 | 80 |

|  | Ex. 2-1-9 | Ex. 2-1-10 | Ex. 2-1-11 | Com. Ex. 2-3-1 | Com. Ex. 2-3-2 | Com. Ex. 2-3-3 |
|---|---|---|---|---|---|---|
| Polyisocyanate composition | PI-a2-9 | PI-a2-10 | PI-a2-11 | PI-b2-1 | PI-b2-2 | PI-b2-3 |
| Polyisocyanate | p-3 | p-4 | p-1 | p-1 | p-1 | p-2 |
| Total average number of NCO | 5.3 | 3.2 | 5.3 | 5.3 | 5.3 | 3.4 |
| Blocking agent | 3,5-DMP | 3,5-DMP | ε-CL | — | 3,5-DMP | MEK-Ox/3,5-DMP |
| Blocking rate (mol %) | 50 | 50 | 50 | 0 | 100 | 100 |
| Partially blocked isocyanate (mol %) | 90 | 75 | 90 | 0 | 0 | 0 |

TABLE 2-2

|  |  | Ex. 2-2-1 | Ex. 2-2-2 | Ex. 2-2-3 | Ex. 2-2-4 | Ex. 2-2-5 | Ex. 2-2-6 | Ex. 2-2-7 | Ex. 2-2-8 |
|---|---|---|---|---|---|---|---|---|---|
| Adhesive resin composition |  | S-a1 | S-a2 | S-a3 | S-a4 | S-a5 | S-a6 | S-a7 | S-a8 |
| Composition | Polyisocyanate composition | PI-a2-1 | PI-a2-2 | PI-a2-3 | PI-a2-4 | PI-a2-5 | PI-a2-6 | PI-a2-7 | PI-a2-8 |
|  | Active hydrogen-containing compound | AH-3 | AH-3 | AH-3 | AH-3 | AH-3 | AH-3 | AH-3 | AH-3 |
|  | NCO/OH | 1 | 1 | 1 | 1 | 1 | 1 | 1 | 1 |
| Evaluation | Solvent resistance before lamination | 3 | 3 | 4 | 4 | 4 | 3 | 4 | 4 |
|  | Adhesion to upper layer | 5 | 4 | 3 | 4 | 5 | 5 | 4 | 5 |
|  | Stability under high temperature and high humidity | 4 | 4 | 3 | 3 | 5 | 4 | 5 | 4 |

|  |  | Ex. 2-2-9 | Ex. 2-2-10 | Ex. 2-2-11 | Com. Ex. 2-4-1 | Com. Ex. 2-4-2 | Com. Ex. 2-4-3 |
|---|---|---|---|---|---|---|---|
| Adhesive resin composition |  | S-a9 | S-a10 | S-a11 | S-b1 | S-b2 | S-b3 |
| Composition | Polyisocyanate composition | PI-a2-9 | PI-a2-10 | PI-a2-11 | PI-b2-1 | PI-b2-2 | PI-b2-3 |
|  | Active hydrogen-containing compound | AH-3 | AH-3 | AH-3 | AH-3 | AH-3 | AH-3 |
|  | NCO/OH | 1 | 1 | 1 | 1 | 1 | 1 |
| Evaluation | Solvent resistance before lamination | 5 | 4 | 4 | 4 | 1 | 1 |
|  | Adhesion to upper layer | 5 | 5 | 3 | 1 | 4 | 4 |
|  | Stability under high temperature and high humidity | 5 | 4 | 3 | 2 | 4 | 3 |

As shown in Table 2-2, in the adhesive resin-cured products using Adhesive Resin Compositions S-a1 to S-a11 (Examples 2-2-1 to Feb. 2, 2011), the solvent resistance before lamination, the adhesion to the upper layer, and the stability under high temperature and high humidity were all excellent.

In addition, among Adhesive Resin Compositions S-a1 and S-a4 (Examples 2-2-1 and 2-2-4), S-a3 and S-a6 (Examples 2-2-3 and 2-2-2), in Adhesive Resin Compositions S-a4 and S-a6 (Examples 2-2-4 and 2-2-6) containing the polyisocyanate compositions having a relatively high blocking rate, the obtained adhesive resin-cured product tended to have a better adhesion to the upper layer and stability under high temperature and high humidity, and in Adhesive Resin Compositions S-a1 and S-a3 (Examples 2-2-1 and 2-2-3) containing the polyisocyanate composition having a relatively low blocking rate, there was tendency in which the solvent resistance of the adhesive resin-cured product before lamination was improved.

Further, among Adhesive Resin Compositions S-a2 and S-a5 (Examples 2-2-2 and 2-2-5), in Adhesive Resin Composition S-a5 (Example 2-2-5) containing the polyisocyanate composition having a relatively high content of the partially blocked polyisocyanate, there was tendency in which the solvent resistance of the adhesive resin-cured product before lamination, adhesion to the upper layer, and the stability under high temperature and high humidity were improved.

Further, among Adhesive Resin Compositions S-a5 and S-a8 to S-a10 (Examples 2-2-5 and 2-2-8 to Feb. 2, 2010), in the adhesive resin compositions S-a5 and S-a9 (Examples 2-2-5 and 2-2-9) containing the polyisocyanate composition having a relatively large total average number of isocyanate groups, there was tendency in which the stability under high temperature and high humidity was improved.

Further, among Adhesive Resin Compositions S-a5, S-a7 and S-a11 (Examples 2-2-5, 2-2-7 and Feb. 2, 2011), in the adhesive resin composition S-a5 (Example 2-2-5) containing the polyisocyanate composition using 3,5-DMP as a blocking agent, there was tendency in which the adhesion of the obtained adhesive resin-cured product with the upper layer was superior to that of the other two cases.

On the other hand, the adhesive resin-cured product using Adhesive Resin Compositions S-b1 to S-b3 (Comparative Examples 2-4-1 to 2-4-3) did not show excellent solvent resistance before lamination, adhesion to the upper layer, and stability under high temperature and high humidity simultaneously.

<(3-1) Preparation of Polyisocyanate Composition>

Example 3-1-1

(Preparation of Polyisocyanate Composition PI-a3-1)

The inside of a four-necked flask equipped with a stirrer, a thermometer, a reflux cooling tube, a nitrogen blowing tube, and a dropping funnel was made into a nitrogen atmosphere, and 500 g of Polyisocyanate p-1 obtained in Synthesis Example 1 and 200 g of butyl acetate were charged, then heated to 60° C. while stirring, and 3,5-dimethylpyrazole (hereinafter, may be abbreviated as "3,5-DMP") was gradually added as a blocking agent in a amount of 0.75 times the molar amount of the isocyanate group in Polyisocyanate p-1. After adding all of them, the mixture was further stirred for 1 hour to obtain Polyisocyanate Composition PI-a3-1.

Comparative Example 3-3-1

(Preparation of Polyisocyanate Composition PI-b3-1)

Polyisocyanate p-2 synthesized in Synthesis Example 2 was diluted with butyl acetate so that the solid content was 75% by mass with respect to the total mass of the composition to obtain Polyisocyanate Composition PI-b3-1.

Comparative Example 3-3-2

(Preparation of Polyisocyanate Composition PI-b3-2)

Polyisocyanate Composition PI-b3-2 was obtained in the same manner as in Example 1 except that the amount of 3,5-dimethylpyrazole was 1.05 times the molar amount of the isocyanate group of the polyisocyanate.

Comparative Example 3-3-3

(Preparation of Polyisocyanate Composition PI-b3-3)

Polyisocyanate Composition PI-b3-3 was obtained in the same manner as in Example 3-1-1 except that a mixture of MEK-Ox and 3,5-DMP (MEK-Ox/3,5-DMP=1/1 (molar ratio)) was used instead of 3,5-dimethylpyrazole, and the molar amount thereof was 1.05 times the molar amount of the isocyanate group.

Example 3-1-12

(Preparation of Polyisocyanate Composition PI-a3-12)

Polyisocyanate Composition PI-b3-1 obtained in Comparative Example 3-3-1 and Polyisocyanate Composition PI-b3-2 obtained in Comparative Example 3-3-2 were mixed with an isocyanate group molar ratio of 2:1 (including the blocked isocyanate group) to obtain Polyisocyanate Composition PI-a3-12.

Examples 3-1-2 to 3-1-11

(Preparation of Polyisocyanate Compositions PI-a3-2 to PI-a3-11)

Polyisocyanate Compositions PI-a3-2 to PI-a3-11 were obtained in the same manner as in Example 1 except that the types of the polyisocyanates and the blocking agents, the blocking rate, and the content (mol %) of the partially blocked polyisocyanates were as shown in Table 3-1.

TABLE 3-1

| | Ex. 3-1-1 | Ex. 3-1-2 | Ex. 3-1-3 | Ex. 3-1-4 | Ex. 3-1-5 | Ex. 3-1-6 | Ex. 3-1-7 | Ex. 3-1-8 |
|---|---|---|---|---|---|---|---|---|
| Polyisocyanate composition | PI-a3-1 | PI-a3-2 | PI-a3-3 | PI-a3-4 | PI-a3-5 | PI-a3-6 | PI-a3-7 | PI-a3-8 |
| Polyisocyanate | p-1 | p-1 | p-1 | p-1 | p-2 | p-2 | p-2 | p-2 |
| Total average number of NCO | 5.3 | 5.3 | 3.4 | 5.3 | 3.4 | 3.4 | 3.4 | 3.4 |
| Blocking agent | 3,5-DMP | 3,5-DMP | 3,5-DMP | 3,5-DMP | 3,5-DMP | 3,5-DMP | 3,5-DMP | MEK-Ox |
| Blocking rate (mol %) (モル%) | 75 | 50 | 85 | 85 | 85 | 50 | 33 | 33 |
| Partially blocked polyisocyanate (mol %) | 80 | 90 | 50 | 50 | 40 | 80 | 60 | 60 |

| | Ex. 3-1-9 | Ex. 3-1-10 | Ex. 3-1-11 | Ex. 3-1-12 | Com. Ex. 3-3-1 | Com. Ex. 3-3-2 | Com. Ex. 3-3-3 |
|---|---|---|---|---|---|---|---|
| Polyisocyanate composition | PI-a3-9 | PI-a3-10 | PI-a3-11 | PI-a3-12 | PI-b3-1 | PI-b3-2 | PI-b3-3 |
| Polyisocyanate | p-2 | p-2 | p-2 | p-2 | p-2 | p-2 | p-2 |
| Total average number of NCO | 3.4 | 3.4 | 3.4 | 3.4 | 3.4 | 3.4 | 3.4 |
| Blocking agent | ε-CL | DEM | 3,5-DMP | 3,5-DMP | — | 3,5-DMP | MEK-Ox/ 3,5-DMP |
| Blocking rate (mol %) (モル%) | 33 | 33 | 15 | 33 | 0 | 100 | 100 |
| Partially blocked polyisocyanate (mol %) | 60 | 60 | 40 | 0 | 0 | 0 | 0 |

<(3-2) Preparation of Coating Composition>

Example 3-2-1

(Preparation of Coating Composition C-a1)

A solvent naphtha solution of an acrylic polyol resin (hydroxy concentration: 4.5% by mass (resin standard), resin solid content: 65% by mass, hereinafter, the resin solution is referred to as "AH-4") was blended with Polyisocyanate Composition PI-a3-1 obtained in Example 3-1-1, so that NCO/OH=1.0, then diluted with butyl acetate so that the solid content was 50% by mass to obtain Coating Composition C-a1.

Examples 3-2-2 to 3-2-12 and Comparative Examples 3-4-1 to 3-4-3

(Coating Compositions C-a2 to C-a12 and C-b1 to C-b3)

The coating compositions C-a2 to C-a12 and C-b1 to C-b3 were obtained in the same manner as in Example 3-2-1 except that the types of the polyisocyanate compositions were as shown in Table 3-2.

In accordance with the above-described methods, the coating compositions prepared in the Examples and the Comparative Examples were evaluated. The results are shown in Table 3-2 below.

TABLE 3-2

|  |  | Ex. 3-2-1 | Ex. 3-2-2 | Ex. 3-2-3 | Ex. 3-2-4 | Ex. 3-2-5 | Ex. 3-2-6 | Ex. 3-2-7 | Ex. 3-2-8 | Ex. 3-2-9 |
|---|---|---|---|---|---|---|---|---|---|---|
| Urethane coating composition |  | C-a1 | C-a2 | C-a3 | C-a4 | C-a5 | C-a6 | C-a7 | C-a8 | C-a9 |
| Composition | Polyisocyanate composition | PI-a3-1 | PI-a3-2 | PI-a3-3 | PI-a3-4 | PI-a3-5 | PI-a3-6 | PI-a3-7 | PI-a3-8 | PI-a3-9 |
|  | Active hydrogen-containing compound | AH-4 | AH-4 | AH-4 | AH-4 | AH-4 | AH-4 | AH-4 | AH-4 | AH-4 |
|  | NCO/OH | 1 | 1 | 1 | 1 | 1 | 1 | 1 | 1 | 1 |
| Evaluation | Low-temperature drying property | ○ | ◎ | ◎ | ○ | ○ | ○ | ◎ | ◎ | ○ |
|  | Solvent resistance of coating film | ○ | ◎ | ◎ | ○ | ○ | ◎ | ◎ | ○ | ○ |
|  | Pot life of coating material | ◎ | ○ | Δ | ◎ | ◎ | ◎ | ○ | ○ | ○ |

|  |  | Ex. 3-2-10 | Ex. 3-2-11 | Ex. 3-2-12 | Com. Ex. 3-4-1 | Com. Ex. 3-4-2 | Com. Ex. 3-4-3 |
|---|---|---|---|---|---|---|---|
| Urethane coating composition |  | C-a10 | C-a11 | C-a12 | C-b1 | C-b2 | C-b3 |
| Composition | Polyisocyanate composition | PI-a3-10 | PI-a3-11 | PI-a3-12 | PI-b3-1 | PI-b3-2 | PI-b3-3 |
|  | Active hydrogen-containing compound | AH-4 | AH-4 | AH-4 | AH-4 | AH-4 | AH-4 |
|  | NCO/OH | 1 | 1 | 1 | 1 | 1 | 1 |
| Evaluation | Low-temperature drying property | ◎ | ◎ | ◎ | ◎ | X | X |
|  | Solvent resistance of coating film | ◎ | ◎ | ○ | ◎ | X | X |
|  | Pot life of coating material | Δ | Δ | Δ | X | ◎ | ◎ |

As shown in Table 3-2, in the coating compositions using Coating Compositions C-a1 to C-a12 (Examples 3-2-1 to 3-2-12), low-temperature drying property of the coating film, solvent resistance of the coating film and the pot life of the coating material were all excellent.

Further, among Coating Compositions C-a1, and C-a4, C-a5, C-a6 (Examples 3-2-1, and 3-2-4, 3-2-5, 3-2-6), in the coating compositions containing the polyisocyanate compositions having a relatively high blocking rate, there was a tendency in which the pot life of the coating material was high, and in Coating Compositions C-a3 and C-a7, C-a8, C-a9, C-a10, C-a11, C-a12 (Example 3-2-3 and 3-2-7, 3-2-8, 3-2-9, 3-2-10, 3-2-11, 3-2-12) containing the polyisocyanate composition having a relatively low blocking rate, there was a tendency in which the low-temperature drying property of the coating composition was improved.

Further, among the coating compositions C-a2 and C-a3, C-a6, C-a7, C-a10, C-a11 (Examples 3-2-2 and 3-2-3, 3-2-6, 3-2-7, 3-2-10, 3-2-11), in the coating compositions containing the polyisocyanate compositions having a middle to relatively low content of the partially blocked polyisocyanates, there was tendency in which the solvent resistance of the obtained coating material-cured product is excellent.

Further, among Coating Compositions C-a7 and C-a12 (Examples 3-2-7 and 3-2-12), in Coating Composition C-a7 (Example 3-2-7), containing the polyisocyanate composition having the same blocking rate but a high proportion of the partially blocked polyisocyanate, there was a tendency that the pot life of the coating material was high.

On the other hand, the coating material-cured products using Coating Compositions C-b1 to C-b3 (Comparative Examples 3-4-1 to 3-4-3) did not show excellent low-temperature drying property of the coating film, solvent resistance of the coating film and the pot life of the coating material simultaneously.

INDUSTRIAL APPLICABILITY

According to the polyisocyanate composition of the present embodiment, it is possible to obtain a polyisocyanate composition having excellent blocking resistance and solvent resistance while maintaining good stretchability of a film when used as a film-forming composition; having excellent solvent resistance before lamination, adhesion to various functional layers used as an upper layer, and stability under high temperature and high humidity when used as an adhesive resin composition; and capable of achieving both solvent resistance of a coating film and usability time of a coating film when used as a coating composition. According to the film-forming composition of the present embodiment, it is possible to provide a film having excellent blocking resistance and solvent resistance while maintaining good stretchability. The film and the film laminate of the present embodiment can be produced by using the film-forming composition, and can be used as a decorative film applicable to articles of various materials. According to the adhesive resin composition and the adhesive resin-cured product of the present embodiment, it is possible to provide an adhesive resin-cured product having excellent solvent resistance before lamination, adhesion to various functional layers used as an upper layer and stability under high temperature and high humidity. According to the coating composition and the coating material-cured product of the present embodiment, it is possible to provide a coating material-cured product having excellent solvent resistance of a coating film and having a sufficient pot life of a coating material.

The invention claimed is:

1. A primary cured film obtained by curing a polyisocyanate composition including at least one isocyanate compound selected from the group consisting of an aliphatic isocyanate and an alicyclic isocyanate as a skeleton, and an active hydrogen-containing composition, comprising
at least one functional group X selected from the group consisting of a urethane group, a urea group, and an amide group produced by curing the active hydrogen-containing compound and the polyisocyanate composition,
an active hydrogen group, and
an isocyanate group blocked with a blocking agent.

2. The primary cured film according to claim 1, wherein a ratio $\gamma/\beta$ between a molar amount $\gamma$ of the functional group X and a molar amount $\beta$ of the isocyanate group blocked with a blocking agent contained in the primary cured film is 0.1 or more and 9.0 or less.

3. The primary cured film according to claim 1, wherein the molar amount $\gamma$ of the functional group X contained in 1 kg of the primary cured film is 0.05 or more and 1.0 or less.

4. The primary cured film according to claim 1, wherein the active hydrogen-containing compound includes an acrylic polyol.

5. The primary cured film according to claim 1, wherein the active hydrogen-containing compound includes a diol.

6. The primary cured film according to claim 1, wherein a tensile elastic modulus of the primary cured film is 0.1 MPa or more and 3.0 MPa or less, the tensile elastic modulus being calculated, using a stress-strain curve in which a measurement temperature is a glass transition temperature of the primary cured film+10° C., and a tensile speed is 100%/min, from an inclination of a linear relationship between a stress and a strain in a region of 5% to 10% of elongation.

* * * * *